(12) United States Patent
Nakamura et al.

(10) Patent No.: US 9,001,139 B2
(45) Date of Patent: Apr. 7, 2015

(54) IMAGE PROCESSING DEVICE AND IMAGE PROCESSING METHOD

(75) Inventors: Sensaburo Nakamura, Shizuoka (JP); Norimasa Ozaki, Kanagawa (JP); Takeo Ugai, Kanagawa (JP); Toshimasa Kakihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 12/831,637

(22) Filed: Jul. 7, 2010

(65) Prior Publication Data

US 2011/0012912 A1 Jan. 20, 2011

(30) Foreign Application Priority Data

Jul. 14, 2009 (JP) ................ P2009-166176

(51) Int. Cl.
  *G09G 5/00* (2006.01)
  *G06T 15/04* (2011.01)
(52) U.S. Cl.
  CPC ...................................... *G06T 15/04* (2013.01)
(58) Field of Classification Search
  CPC ....... G06T 15/04; G06T 11/001; G06T 7/402; G06T 11/40; G06T 15/503; G06T 17/00
  USPC ................... 345/382, 582, 629, 581
  See application file for complete search history.

(56) References Cited

U.S. PATENT DOCUMENTS

| 6,573,842 B2 * | 6/2003 | Mochizuki et al. ....... 340/995.14 |
| 2006/0244757 A1 * | 11/2006 | Fang et al. ..................... 345/582 |
| 2009/0251478 A1 * | 10/2009 | Maillot et al. ................ 345/581 |
| 2009/0303392 A1 * | 12/2009 | Terai et al. ..................... 348/699 |
| 2010/0027888 A1 * | 2/2010 | Katano et al. ................. 382/173 |
| 2013/0127889 A1 * | 5/2013 | Winnemoeller et al. ...... 345/582 |

FOREIGN PATENT DOCUMENTS

| JP | 2002 15339 | 1/2002 |
| JP | 2006 325165 | 11/2006 |

* cited by examiner

*Primary Examiner* — Ke Xiao
*Assistant Examiner* — Kim-Thanh T Tran
(74) *Attorney, Agent, or Firm* — Sony Corporation

(57) ABSTRACT

An image processing device includes an image generation mechanism configured to generate computer graphics images based on computer graphics description data, an image mapping mechanism configured to designate an object or a part of the object of computer graphics drawn by the image generation mechanism as a texture map target, and to texture map texture map images to a surface of the texture map target, and a superimposition mechanism configured to superimpose superimposition images at a position corresponding to the texture map target of the computer graphics images where the texture map has been performed in the image mapping mechanism, based on position information for the texture map target of the computer graphic image.

18 Claims, 24 Drawing Sheets

FIG. 2

KIND EXAMPLE: phong

| PARAMETER | VALUE | MEANING |
|---|---|---|
| <emission> | COLOR | AMOUNT OF LIGHT EMITTED FROM LIGHT SOURCE |
| <ambient> | COLOR | AMOUNT OF AMBIENT EMISSION LIGHT |
| <diffuse> | COLOR | AMOUNT OF DIFFUSED REFLECTION LIGHT |
| <specular> | COLOR | AMOUNT OF LIGHT REFLECTED FROM MIRROR SURFACE |
| <shininess> | NUMERICAL VALUE | REFLECTION BUMP ON MIRROR SURFACE |
| <reflective> | COLOR | COMPLETE MIRROR SURFACE REFLECTION |
| <reflectivity> | NUMERICAL VALUE | AMOUNT OF LIGHT ADDED TO COMPLETE MIRROR SURFACE REFLECTION |
| <transparent> | COLOR | COLOR OF COMPLETELY REFRACTED LIGHT |
| <transparency> | NUMERICAL VALUE | AMOUNT OF LIGHT ADDED TO COMPLETE REFRACTION |

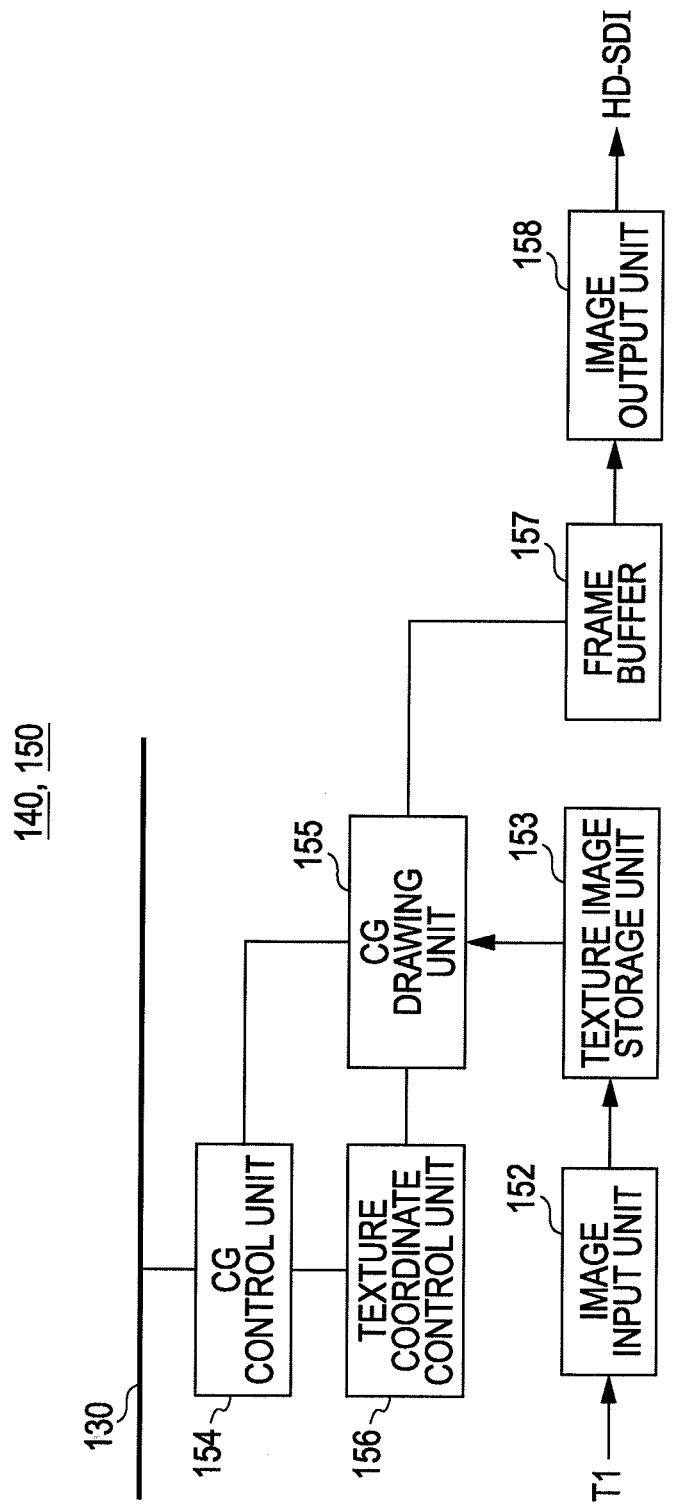

| | ASSIGNMENT OF DESIGNATION BUTTON LINE | |
|---|---|---|
| 1 | S1 | Select |
| 2 | S2 | Select |
| 3 | S3 | Select |
| 4 | S4 | Select |
| 5 | Metal-1 | Select |
| 6 | Material-Def3 | Select |
| 7 | | Select |
| 8 | | Select |

FIG. 15B

SELECTION OF OUTPUT BUS LINE

○ S1　　　● Metal-1

○ S2　　　○ Metal-2

○ S3　　　○ Material-Def1

○ S4　　　○ Material-Def2

○ Material-Def3

[ OK ]　　　[ CANCEL ]

FIG. 16

| BUS NUMBER | MAPPING INPUT |
|---|---|
| 1 | T1 |
| 2 | T2 |
| 3 | T3 |
| 4 | T4 |
| 5 | NA |
| 6 | NA |
| ⋮ | ⋮ |

FIG. 17A

| MAPPING INPUT | ATTRIBUTE VALUE (NAME) |
|---|---|
| T1 | Metal-1 |
| T2 | Material-Def3 |
| T3 | NA (NONE) |
| T4 | NA (NONE) |

FIG. 17B

| MAPPING INPUT | ATTRIBUTE VALUE (NAME) |
|---|---|
| T1 | Metal-1   Material-Def2 |
| T2 | Material-Def3 |
| T3 | NA (NONE) |
| T4 | NA (NONE) |

FIG. 18A

| TEXTURE MAP IMAGE | SUPERIMPOSITION IMAGE |
|---|---|
| T1 | S1 |

FIG. 18B

| TEXTURE MAP IMAGE | SUPERIMPOSITION IMAGE |
|---|---|
| T1 | S1, S2 |

FIG. 18C

| TEXTURE MAP IMAGE | SUPERIMPOSITION IMAGE |
|---|---|
| T1 | S1 |
| T4 | S2 |

FIG. 18D

| TEXTURE MAP IMAGE | SUPERIMPOSITION IMAGE |
|---|---|
| T1 | S1 |
| T2 | S1 |
| T3 | S1 |
| T4 | S1 |

FIG. 18E

| TEXTURE MAP IMAGE | SUPERIMPOSITION IMAGE |
|---|---|
| T1 | S1, S2 |
| T3 | S2 |

FIG. 18F

| TEXTURE MAP IMAGE | SUPERIMPOSITION IMAGE |
|---|---|
| T3 | S1, S2, S3, S4 |

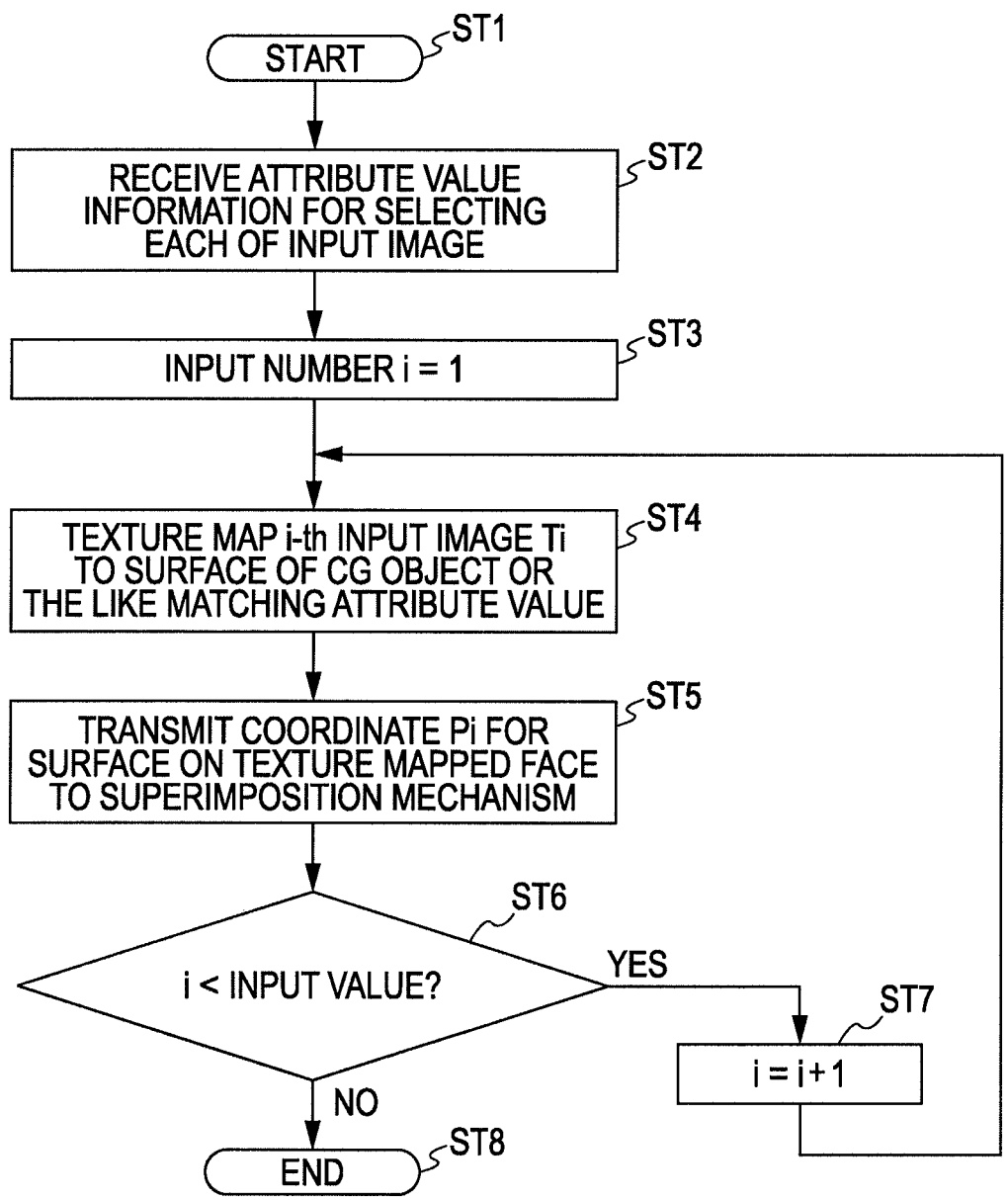

IMAGE PROCESSING DEVICE AND IMAGE PROCESSING METHOD

BACKGROUND OF THE INVENTION

1. Field of the Invention

The present invention relates to an image processing device and an image processing method, and more particularly, to an image processing device or the like which performs an image synthesis by texture mapping an image by image data to computer graphics images.

2. Description of the Related Art

In a three-dimensional graphics system, an image's entirety is drawn by decomposing three-dimensional coordinates into polygons such as triangles and drawing the polygons. Therefore, in this case, the three-dimensional image can be said to be defined by the combination of the polygons. Meanwhile, surfaces of ambient things have many repetitive patterns of complicated shapes, and the shapes or the patterns are complicated and detailed, and thus it is difficult to model each shape or pattern as a triangle or the like. Therefore, as a means for solving this, a texture map can be used.

The texture map realizes an image with high realism with a small number of vertices by adding image data received from a scanner or the like to an object surface, defines a mapping from the object coordinate system to the texture coordinate system, finds out a mapping from the window coordinate system to the texture coordinate system, and finds out texels (texture cell elements) which are elements of texture corresponding to the respective pixels (picture cell elements) at the window coordinate system.

Image data used for the texture is stored in a memory area called a texture memory. Accordingly, the texture memory is update process is performed at any time using moving image data, and thereby the texture map process related to the moving image can be performed.

For example, a telop generation device is disclosed in Japanese Unexamined Patent Application Publication No. 2006-325165 which is an example of related art, in which a stereopsis object desired to be given a telop is recognized in a stereoscopic vision image, and parallax corresponding to this stereopsis object is provided to the telop so as not to harm the entire stereoscopic vision. Also, for example, a three-dimensional picture edition display device, disclosed in Japanese Unexamined Patent Application Publication No. 2002-015339 which is an example of related art, enables character edition and/or display temporally synchronized with a three-dimensional object.

SUMMARY OF THE INVENTION

In the telop/superimposition in the related art, an image of character strings is inserted into an image which is designated as a target. When the character string by superimposition is inserted into an image which is texture mapped to a surface of the CG object, the character string becomes difficult to be read depending on a situation for the texture mapped face, for example, when the text mapped face is rotated, reduced, or distorted. For example, FIG. 28A shows a case where texture mapped faces are rotated, and FIG. 28B shows a case where the texture mapped faces are reduced. In these cases, the character string "coffee cup" is difficult to be read.

At the time of CG creation, the character string is created as the CG object and is displayed as an image in a virtual three-dimensional (3D) space, this enables the character string to be read easily. However, when the texture map image is changed at the time of an operation, it is difficult to change the character string corresponding to each image and display it. In addition, at the time of the operation such as live broadcasts, the insertion of the character string is made by operating a portion called a keying function of an effect switcher, and further is expected to be operated reliably.

It is desirable that a character string related to a texture map image can be inserted at a position corresponding to the image so as to be easily viewed in a case where created CG is used by operation or the like of a live broadcast.

An image processing device according to an embodiment of the invention includes an image generation means configured to generate computer graphics images based on computer graphics description data; an image mapping means configured to designate an object or a part of the object of computer graphics drawn by the image generation means as a texture map target, and to texture map texture map images to a surface of the texture map target; and a superimposition means configured to superimpose superimposition images at a position corresponding to the texture map target of the computer graphics images where the texture map has been performed in the image mapping means, based on position information for the texture map target of a computer graphics image.

The computer graphics images may be generated by the image generation means based on the computer graphics description data. In this case, three-dimensional coordinates decomposed into a polygon such as triangle, and the polygon is drawn, thereby drawing an entire image. Also, the image mapping means may designate an object or a part of the object of computer graphics drawn by the image generation means as a texture map target, and texture maps texture map images to a surface of the texture map target.

For example, a texture map image data selection means may select one piece of image data from plural pieces of input image data. The image mapping means may texture map a texture map image by image data selected by the texture map image data selection means, on a surface of the texture map target. In this case, an operator can change texture mapped images by changing image data selected by the texture map image selection means.

In addition, the superimposition means may superimpose the superimposition image on the computer graphics image where the texture map has been performed in the image mapping means. In this case, the superimposition image may be superimposed at a position corresponding to the texture map target, based on position information for the texture map target of the computer graphics image.

For example, a superimposition image data selection means may select one piece of image data from plural pieces of input image data. The superimposition means may superimpose a superimposition image by image data selected by the superimposition image data selection means. In this case, an operator can change superimposition images (images such as character strings) by changing image data selected by the superimposition image selection means. Also, a superimposition image generation means may generate the superimposition images as computer graphics objects.

In this way, the texture map image may be texture mapped on the surface of the texture map target. In addition, the superimposition image may be superimposed on the computer graphics image where the texture map image is texture mapped, at a position corresponding to the texture map target, based on the position information for the texture map target. Therefore, the character string related to the texture mapped image can be inserted at a position corresponding to the image so as to be easily viewed.

In addition, there may be further provided, for example, an information setting means which sets a correspondence relation between one or plural families of the texture map images and one or plural families of the superimposition images, and the superimposition means may superimpose the superimposition images corresponding to the texture map images which are texture mapped to the face of the texture map target at the position corresponding to the texture map target, based on the correspondence relation set in the information setting means. In this case, even when there are plural families of the texture map images or the superimposition images, the character string related to the texture map image can be conveniently inserted at the position corresponding to the image so as to be easily viewed.

Also, for example, there may be provided a surface designation means which designates the texture map target by selecting predetermined attribute values in the computer graphics description data, and the surface designation means may designate the texture map target for each family of the texture map images. The attribute is, for example, a material definition, or surface information belonging to the material definition or the like.

Also, for example, there may be a mode switching means which switches a first mode where the texture mapped computer graphics image is used and a second mode where another image different from the computer graphics image is used, and the superimposition means may superimpose, when switched to the first mode, the superimposition image at a position corresponding to the texture map target of the computer graphics image where the texture map has been performed in the image mapping means, based on position information for the texture map target of the computer graphics image, and to superimpose, when switched to the second mode, the superimposition image at a predetermined position of another image.

According to the embodiment of the invention, on the computer graphics image obtained by mapping the texture map image to the surface of the texture map target, the superimposition image is superimposed at a position corresponding to the texture map target, based on position information for the texture map target. The character string related to the texture mapped image can be inserted at a position corresponding to the image so as to be easily viewed.

BRIEF DESCRIPTION OF THE DRAWINGS

FIG. 2 is a table illustrating an example of surface information belonging to a material.

FIG. 5 is a diagram illustrating a configuration example of a functional block of the image generation mechanism and the image mapping mechanism.

FIGS. 15A and 15B are diagrams illustrating a GUI display example displayed at the time of assignment of a designation button line and a CUI display example displayed at the time of selection of output bus lines, respectively.

FIG. 16 is a diagram illustrating an example of a mapping input correspondence table indicating a correspondence of bus numbers of the output bus lines and mapping inputs.

FIGS. 17A and 17B are diagrams illustrating examples of image assignment tables indicating a correspondence relation between the mapping inputs and attribute values (name).

FIGS. 18A to 18F are diagrams illustrating examples of image correspondence tables indicating a correspondence relation between a texture map image and a superimposition image.

FIG. 19 is a flowchart illustrating processing steps corresponding to one frame in the image mapping mechanism.

DESCRIPTION OF THE PREFERRED EMBODIMENTS

Hereinafter, embodiments of the invention will be described. The description thereof will be made as follows.

Figure 1:
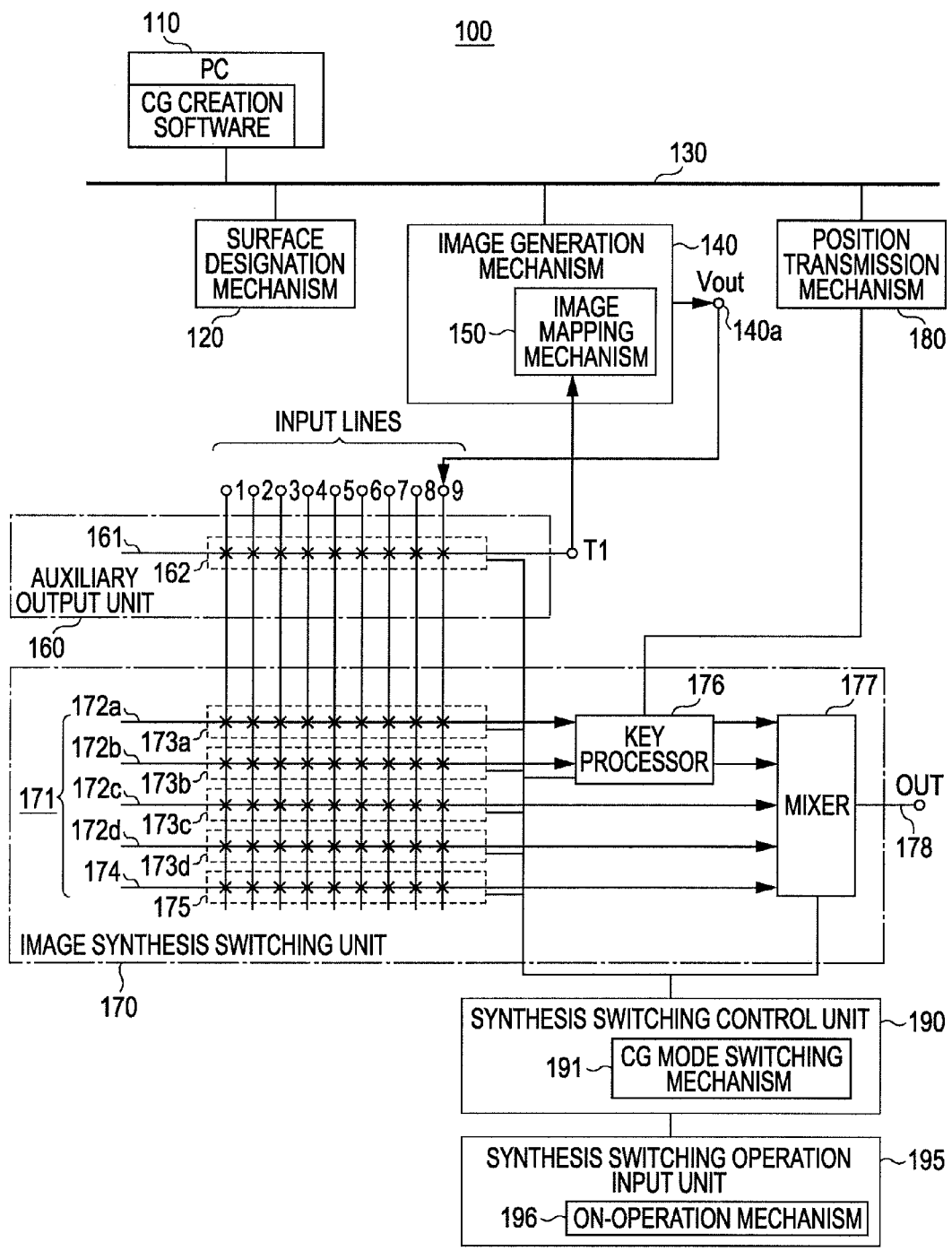
FIG. 1 is a block diagram illustrating a configuration example of an image processing device according to a first embodiment.

1. First Embodiment
2. Second Embodiment
3. Third Embodiment
4. Fourth Embodiment
5. Modified Example
1. First Embodiment
Configuration of an Image Processing Device A first embodiment of the invention will be described. FIG. 1 shows a configuration example of an image processing device 100 according to the first embodiment. The image processing device 100 includes a CG (computer graphics) creation mechanism 110, a surface designation mechanism 120, a network 130, an image generation mechanism 140, and an image mapping mechanism 150. Also, the image processing device 100 includes an auxiliary output unit 160, an image synthesis switching unit 170, a position transmission mechanism 180, a synthesis switching control unit 190, and a synthesis switching operation input unit 195. The CG creation mechanism 110, the surface designation mechanism 120, the image generation mechanism 140, and the position transmission mechanism 180 are respectively connected to the network 130.

The CG creation mechanism 110 is constituted by a PC (personal computer) installed with CG creation software. The CG creation mechanism 110 outputs CG description data with a specific format. As the format of the CG description data, for example, there is a Collada (registered trademark). The Collada is a description definition for realizing exchange of 3D CG data on XML (Extensible Markup Language). The CG description data describes, for example, the following pieces of information.

(a) Definition of Material

The definition of material is a quality (hue) for surfaces of a CG object. This definition of material includes colors, a method of color reflection, emission of light, bump, and so on. Also, this definition of material may include information for texture map. The texture map is a method of adding an image to the CG object, as described above, and enables complicated shapes to be represented while decreasing loads on the processing device. FIG. 2 shows an example of surface information which a material has. The texture map may be designated instead of the colors.

(b) Definition of Geometry Information

This definition of geometry information includes information for position coordinates, vertex coordinates regarding polygon meshes or the like.

(c) Definition of Camera

This definition of camera includes parameters for a camera.

(d) Definition of Animation

The definition of animation includes information for various values in each key frame of animation. Also, the definition of animation includes time information in each key frame of animation. The various pieces of information are for example, information for a time, a position or a coordinate value of a vertex, a size, a tangent vector, an interpolation method in a key frame point of a corresponding object (node), variations in various kinds of information of animation, or the like.

(e) In a scene, a position, a direction, a size, a corresponding geometry information definition, and a corresponding material definition, for a node (object)

These pieces of information are not separated but correspond to each other as follows.
Node . . . geometry information
Node . . . material (plural)
Geometry information . . . polygon set (plural)
Polygon set . . . material (one corresponding to a node)
Animation . . . node A description forming a single screen is called a scene. Each definition is called a library and is referred to in the scene. For example, when there are two cuboid objects, each is described as one node, and each node is associated with any one of the material definitions. As a result, each cuboid object is associated with the material definitions, and colors or reflection characteristics according to the respective material definitions are drawn.

When the cuboid object is described by a plurality of polygon sets, and thus the material definitions are associated with the polygon sets, each polygon set is drawn by a different material definition. For example, although the faces of the cuboid are six, three faces thereof are described by one polygon set, one face thereof described by one polygon set, and two faces thereof described by one polygon set, and, like this, the cuboid object may be described by the three polygon sets. In order to associate different material definitions with each polygon set, the respective faces can be drawn by different colors. In the later-described image mapping mechanism, an object or a part of the object (faces or a division unit of a polygon mesh or the like) becomes a texture map target.

The following shows a sample of the Collada file (a part of clipping example) as the CG description data. In this sample, a material of a name (value) named "01MatDefault" is defined. It is described that regarding an actual content of this material, an effect of "01MatDefault-fx" is referred to. Also, in this sample, the material definition of "01MatDefault" is combined with the geometry information definition of "#Box01-lib" in <library_visual_scenes>, which is then drawn.

Referring back to FIG. 1, the image synthesis switching unit 170 has an input selection unit 171, a key processor (image processing unit) 176, and a mixer 177. The input selection unit 171 selects plural pieces of input image data so as to be connected to a plurality of output channels. In other words, the input selection unit 171 enables nine input lines through which plural pieces of image data are input from an external device to be selectively connected to a key source bus 172*a*, a key fill bus 172*b*, a background A bus 172*c*, a foreground B bus 172*d*, and a preliminary input bus 174. The key source bus 172*a* and the key fill bus 172*b* of the input selection unit 171 constitute a superimposition image data selection mechanism.

The preliminary input bus 174 has the same functions as the other buses, but a synthesis switching operation input unit 195 does not make a designation of direct input selection for the bus. The preliminary input bus 174 is an internally used bus which does not show its presence to an operator. In this embodiment, in a CG output mode where a superimposition image such as a character string is superimposed on a CG image, the input line "9" is connected to the preliminary input bus 174.

The nine input lines are arranged in one direction in the figure. Image data is input to each of the input lines "1" to "8" from a VTR, a video camera or the like. CG image data output from the image generation mechanism 140 is input to the input line "9." The key source bus 172*a*, the key fill bus 172*b*, the background A bus 172*c*, the background B bus 172*d*, and the preliminary input bus 174 are arranged in the other direction while intersecting the input lines.

A cross point switch group 173*a* enables the nine input lines and the key source bus 172*a* to be connected to each other at the respective cross point where the both intersect each other. A cross point switch group 173*b* enables the nine input lines and the key fill bus 172*b* to be connected to each other at the respective cross point where the both intersect each other. A key source signal extracted from the key source bus 172a is sent to the key processor 176. In addition, a key fill signal extracted from the key fill bus 172b is sent to the key processor 176. The key fill signal is a signal which overlaps a background image as a foreground, and the key source signal is a signal which designates a region where the key fill signal overlaps, a shape formed by cutting out the background image, a concentration of the key fill signal relative to the background image, or the like.

A cross point switch group 173c enables the nine input lines and the background A bus 172c to be connected to each other at the respective cross point where the both intersect each other. A cross point switch group 173d enables the nine input lines and the background B bus 172d to be connected to each other at the respective cross point where the both intersect each other. A cross point switch group 175 enables the nine input lines and the preliminary bus 174 to be connected to each other at the respective cross point where the both intersect each other. Background A data extracted from the background A bus 172c and background B data extracted from the background B bus 172d are sent to the mixer 177. CG image data extracted from the preliminary input bus 174 is sent to the mixer 177.

The key processor 176 adjusts and processes the key source signal and the key fill signal to be suitable for keying, based on key adjustment values which are various parameters for performing keying. Here, the key adjustment values are, for example, a value for adjusting a concentration of the key fill signal relative to a background image, a value for adjusting a threshold value of a signal level of an image which the key source signal determines, a value for adjusting a boundary line of a background image, and so forth. The key fill signal and the key source signal adjusted and processed by the key processor 176 are sent to the mixer 177.

The mixer 177 superimposes a foreground image on a background image or a CG image using the keying, based on the key fill signal and the key source signal from the key processor 176. The image data obtained by the mixer 177 is output to an external device via the output line 178. The mixer 177 and the key processor 176 constitute a superimposition mechanism.

The auxiliary output unit 160 selects an auxiliary output. The auxiliary output unit 160 enables the nine input lines where plural pieces of image data are input from an external device to be selectively connected to an auxiliary output selection bus 161. A cross point switch group 162 enables the nine input lines and the auxiliary output selection bus 161 to be connected to each other at the respective cross points where the both intersect each other. Image data extracted from the auxiliary output selection bus 161 is sent to the image mapping mechanism 150 as texture map image data T1. This auxiliary output unit 160 constitutes a texture map image data selection mechanism.

The synthesis switching control unit 190 controls processing operations in the mixer 177, the input selection unit 171 and the auxiliary output unit 160 in response to control signals from the synthesis switching operation input unit 195. The control signals from the synthesis switching operation input unit 195 include, pattern designation information which designates processing pattern in the mixer 177, and selection instruction information which instructs a selection change operation for input images in each cross point switch group.

In addition, the synthesis switching control unit 190 has a CG mode switching mechanism 191. The CG mode switching mechanism 191 changes a CG output mode and a full-screen output mode in response to control signals from the synthesis switching operation input unit 195. Here, the CG output mode is a mode of using a CG image on which a texture map image is texture mapped in the image mapping mechanism 150. The full-screen output mode is a mode of using other images different from the CG image.

The synthesis switching operation input unit 195 is provided with switches for instructing processing patterns and a progression ratio keying synthesis operation in the mixer 177, and a selection operation for input images in the auxiliary output unit 160 and the input selection unit 171. The synthesis switching operation input unit 195 generates a control signal for controlling processing operations in the mixer 177, the input selection unit 171, and the auxiliary output unit 160 in response to an operation input from an operator, and transmits it to the synthesis switching control unit 190.

For example, the designation of numbers for the processing patterns in the mixer 177 is made using ten keys (figure keys) or button switches or the like. Also, for example, the designation of numbers for the input lines which are connected to each bus is made in the input selection unit 171 and the auxiliary output unit 160 using the ten keys (figure keys) or button switches. For example, the designation of the progression ratio is made in the mixer 177 by the movement of a fader switch. In addition, for example, contents in processing patterns are set in the mixer 177 by the operation of the switches.

The synthesis switching operation input unit 195 has an On-operation mechanism 196 constituted by button switches or the like. The On-operation mechanism 196 is, in the CG output mode, used for an operator to start or finish that a superimposition image which is a foreground image is superimposed (overlapped) on a CG image which is a background image by the mixer 177.

Figure 3:
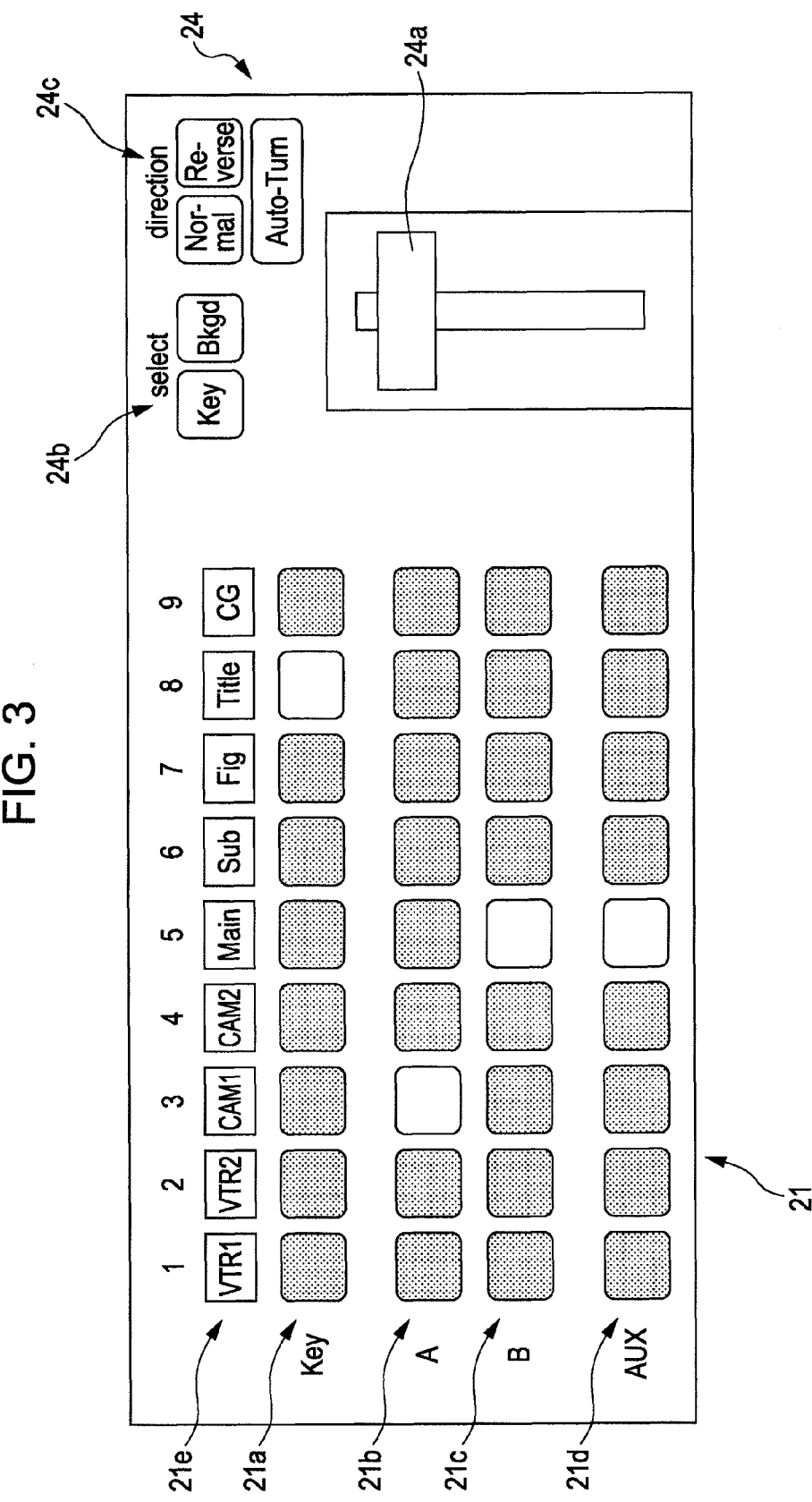
FIG. 3 is a diagram illustrating an example of an appearance of a control panel constituting a synthesis switching operation input unit.

FIG. 3 shows an example of an appearance of a control panel constituting the synthesis switching operation input unit 195.

The control panel is largely classified to be provided with a button arrangement unit 21 and a progression state operation unit 24. The button arrangement unit 21 includes a key selection unit 21a which selects the image signals extracted from the key source bus and the key fill bus, a background A selection unit 21b which selects the image signals extracted from the background A bus, and a background B selection unit 21c which selects the image signals extracted from the background B bus. Also, the button arrangement unit 21 is further provided with an auxiliary output selection unit 21d which selects the image signals extracted from the auxiliary output selection bus 161.

The respective selection units are constituted by alternative button switches for selecting connections between the respective nine input lines and the respective buses, and a selected button lights up. For example, in the example shown in FIG. 3, the input line "8" is selected by the key selection unit 21a, the input line "3" is selected by the background A selection unit 21b, the input line "5" is selected by the background B selection unit 21c, and the input line "5" is selected by the auxiliary output selection unit 21d. Names for identifying images input to the respective input lines are displayed on a character display unit 21e placed in the upper side of the respective button switches.

In the key selection unit 21a, the connection to both of the key source bus and the key fill bus can be changed by pushing one button switch. At this time, it is set in advance whether the same input line is selected or different lines are selected in the respective buses. For example, it is set that, when the button switch "1" is selected, the input line "1" is connected to the key source bus, and the neighboring input line "2" is connected to the key fill bus.

The progression state operation unit 24 is provided with a fader lever 24a. It is possible to vary a progression state of the processing in the mixer 177 by sliding the fader lever 24a from one end to the other end in the sliding range. A transition target selection unit 24b, in which as a transition target by the operation of the fader lever 24a whether key signals or background image signals is selected by the button switches, is placed in the upper side of the progression state operation unit 24. Also, in the upper side of the progression state operation unit 24, a direction setting unit 24c is placed in which a transition direction is set by the button switches.

The image generation mechanism 140 generates a CG image which is a 3D spatial image on the basis of the CG description data created by the CG creation mechanism 110. The image generation mechanism 140 generates an image in real time of an animation frame, not a rendering processing taking a time. When the image generation mechanism 140 reads the CG description data to fully analyze, it stores information for the respective definitions or the like in a memory, and stores the correspondence thereof as a data structure.

The image generation mechanism 140 stores various kinds of values in a key frame for executing animation in the memory. For example, in order to draw polygon sets which are present in the geometry information for a certain node, the material definition corresponding to the geometry information is referred to, and the drawing is made according to the designation of its colors or the like. In the case of animation, a current time is progressed for each frame, each value in prior and posterior key frames is interpolated to be determined, and then the drawing is made.

The image generation mechanism 140 receives, from the surface designation mechanism 120, information for the designation of a CG object or a part of the object (faces or a division unit of a polygon mesh) which is a target where an input image is texture mapped. The image generation mechanism 140 controls the image mapping mechanism 150 to texture map the input image to surfaces of a predetermined polygon (polygon set) indicated by the designation information.

The image mapping mechanism 150 texture maps the input image to a surface of a texture map target designated by the surface designation mechanism 120, among the CG drawn by the image generation mechanism 140. The image mapping mechanism 150 is installed as a single body with the image generation mechanism 140. The image mapping mechanism 150 is implemented by control due to software installed in a CPU (central processing unit) and working due to hardware such as a GPU (graphics processing unit). The control software designates a polygon set undergoing the texture map and notifies the hardware of it.

Figure 4:
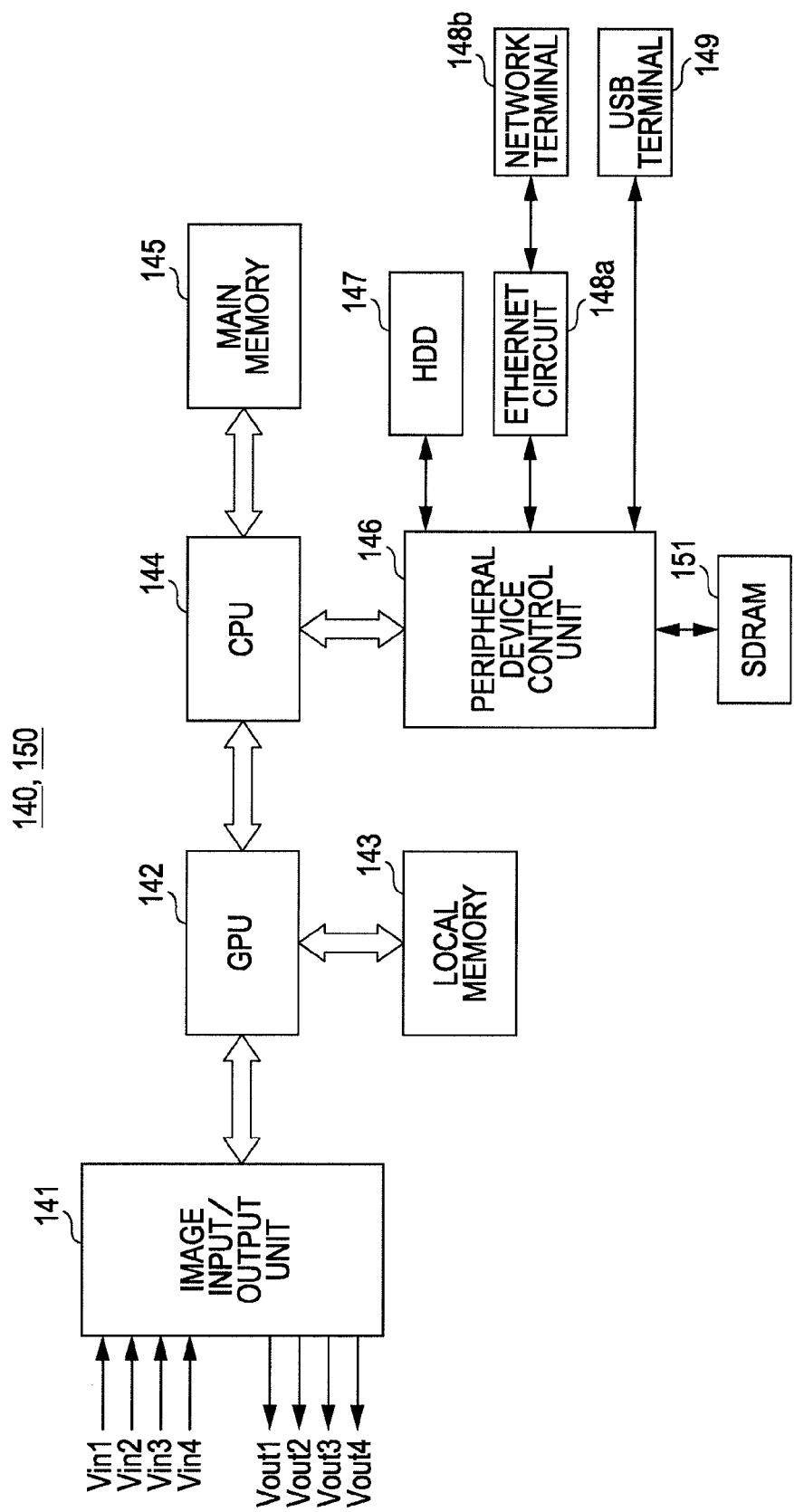
FIG. 4 is a block diagram illustrating a detailed configuration example of an image generation mechanism and an image mapping mechanism.

A configuration example of the image generation mechanism and the image mapping mechanism FIG. 4 shows a detailed configuration example of the image generation mechanism 140 and the image mapping mechanism 150. The image generation mechanism 140 and the image mapping mechanism 150 include an image input/output unit 141, a GPU 142, a local memory 143, a CPU 144, and a main memory 145. Also, the image generation mechanism 140 and the image mapping mechanism 150 include a peripheral device control mechanism 146, a hard disc drive (HDD) 147, an Ethernet circuit 148a, and a network terminal 148b. Further, the image generation mechanism 140 and the image mapping mechanism 150 include a USB (universal serial bus) terminal 149 and an SDRAM (Synchronous DRAM) 151. Here, the "Ethernet" is a registered trademark.

The image input/output unit 141 inputs image data used for the texture map, and outputs image data of a CG image where an image by the image data is properly texture mapped. The image input/output unit 141 can maximally input four families of image data, and maximally output four families of image data. The image data treated herein is image data with HD-SDI (High Definition television-Serial Digital Interface) format defined by SMPTE292M. The GPU 142 and the main memory 145 can equally have access to the image input/output unit 141.

The main memory 145 functions as a work area of the CPU 144 and temporarily stores the image data input from the image input/output unit 141. The CPU 144 controls the whole of the image generation mechanism 140 and the image mapping mechanism 150. The CPU 144 is connected to the peripheral device control unit 146. The peripheral device control unit 146 interfaces the CPU 144 and peripheral devices.

The CPU 144 is connected to the internal hard disc drive 147 via the peripheral device control unit 146. In addition, the CPU 144 is connected to the network terminal 148b via the peripheral device control unit 146 and the Ethernet circuit 148a. Also, the CPU 144 is connected to the USB terminal 149 via the peripheral device control unit 146. Further, the CPU 144 is connected to the SDRAM 151 via the peripheral device control unit 146.

The CPU 144 performs control for texture coordinates. That is to say, the CPU 144 performs a processing so that an image by the input image data is texture mapped to a surface of a polygon drawn by the GPU 142. The GPU 142 generates a CG image based on the CG description data stored in the hard disc drive 147 or the like, and texture maps an input image to a surface of a designated texture map target if necessary. The local memory 143 functions as a work area of the GPU 142, and temporarily stores image data for the CG image created by the GPU 142.

The CPU 144 can have access to the main memory 145 and also have access to the local memory 143. Likewise, the GPU 142 can have access to the local memory 143 and also have access to the main memory 145. The CG image data firstly stored in the local memory 143 after generated by the GPU 142 is sequentially read from the local memory 143 and output from the image input/output unit 141.

FIG. 5 shows a configuration example of functional blocks of the image generation mechanism 140 and the image mapping mechanism 150. The image generation mechanism 140 and the image mapping mechanism 150 include functional blocks, such as an image input unit 152, a texture image storage unit 153, a CG control unit 154, a CG drawing unit 155, a texture coordinate control unit 156, a frame buffer 157, and an image output unit 158.

The image input unit 152 and the image output unit 158 is constituted by the image input/output unit 141. The texture image storage unit 153 is constituted by the main memory 145. The CG control unit 154 and the texture coordinate control unit 156 are constituted by the CPU 144. The CG drawing unit 155 is constituted by the GPU 142. The frame buffer 157 is constituted by the local memory 143.

The image input unit 152 and the texture image storage unit 153 form a pair, and expansion of these leads to expanding families of input data. In addition, the frame buffer 157 and the image output unit 158 form a pair, and expansion of these leads to expanding families of input data.

Figure 6A:
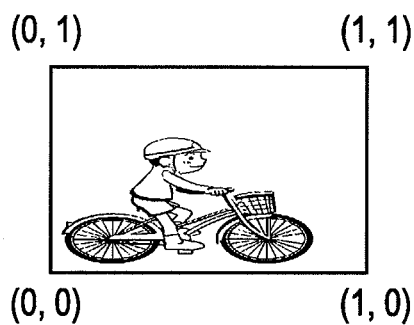
FIG. 6A and FIG. 6B are diagrams illustrating examples of a texture image and a UV map when the texture map is performed.
Figure 6B:
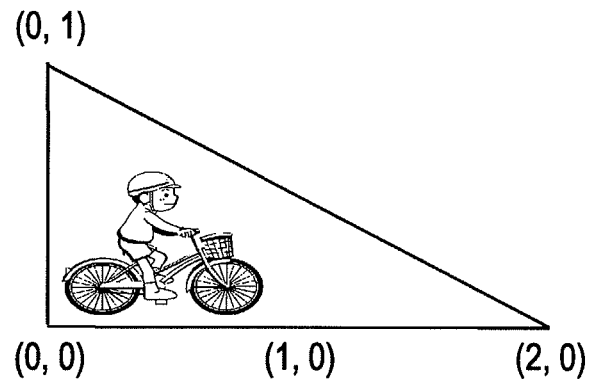

FIG. 6 shows an example of a texture image and a UV map when the texture map is made. FIG. 6A shows a texture image, and FIG. 6B shows a UV map. Here, the UV map means a map indicated by coordinates on a paper surface when a surface of a certain object (node) is considered as the paper surface. When this map is spread out on a plane, a point (x, y) on the plane corresponds to a point (u, v) on the surface of the object. For this reason, the texture image is added to the UV map and thus the texture map is realized where the texture image is added to the surface of the object. FIG. 6B shows a state where the texture image is added to the UV map.

Referring to FIG. 1 again, the surface designation mechanism 120, as described above, designates a texture map target which is an input image undergoing the texture map. The surface designation mechanism 120 sends the designation information to the image generation mechanism 140 via the network 130. The surface designation mechanism 120 is implemented by, for example, a GUI (Graphical User Interface).

The surface designation mechanism 120 displays the attribute values (names) given to an object or a part of the object in the CG description data, as an option, enables an operator to select it, and thereby enables the operator to select an object or a part of the object which is a texture map target. The surface designation mechanism 120 sends the attribute values given to the texture map target in the CG description data, as designation information for a text map target, to the image generation mechanism 140.

In this embodiment, since the material definition can correspond to the texture map target in the CG description data, an attribute such as surface information belonging to the material definition is given to the target. For example, when the material definition is made to correspond to the CG object, all the faces of CG object have the same surface attribute (color or the like). For example, in the case of stone, or a metal product such as a spoon, a CG can be created using this correspondence.

Figure 7:
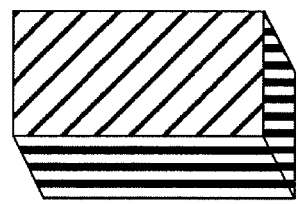
FIG. 7 is a diagram illustrating giving different attributes to the respective faces of a CG object (subset of polygon).

In the meantime, a thing having different surface attributes in the respective faces typically has different surface attributes, for example, a pencil has a periphery, lead, cut tree texture or the like. This stuff is created by a CG, the respective surfaces may be created as different CG objects and then combined. However, in this case, as shown in FIG. 7, which shows one CG object, it is also easily performed to create the CG object by giving a different attribute to each face (subset of the polygon).

Generally, in the creation of a CG object, a polygon set forming surfaces is divided into several pieces, each material definition is made to correspond thereto, and the operation is performed so that a UV coordinate value for the texture map is determined for each vertex of a target polygon. The same CG description data corresponding to this operation is created. The embodiment of the invention is applied to this CG description data and thus an input image can be texture mapped to a part of surface of the CG object.

The position transmission mechanism 180 sends position information for the texture map target sent from the image generation mechanism 140 via the network 130, to the key processor 176 of the image synthesis switching unit 170. The key processor 176 adjusts the key fill signal and the key source signal so that a superimposition image such as a character string which will be superimposed on the CG image data which is a background image, is superimposed at a position corresponding to the texture map target. When the texture map target is moved by the progression of animation, position information for each frame (typically, each frame or each field) where the movement occurs is sent from the image generation mechanism 140 to the position transmission mechanism 180 and then to the key processor 176.

Description of Position Information

The position information will be described. FIGS. 8A to 8D show a meaning of the position information and an operation example according to an embodiment of the invention.

Figure 8A:
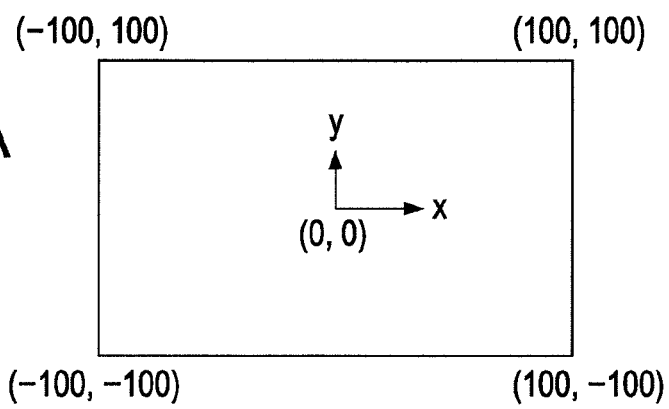
FIGS. 8A to 8D are diagrams illustrating a meaning of position information and an operation example according to an embodiment of the invention.
Figure 8B:
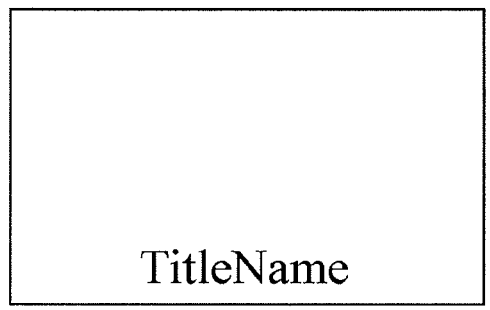

FIG. 8A is a diagram illustrating a position coordinate on a screen. The transverse direction x and the longitudinal direction y equally take up the size of the screen from −100 to +100. Since the coordinates are relative, differences between x and y are the same on the coordinates, but lengths on the actual screen are different. FIG. 8B shows an example of a foreground image (a superimposition image which is superimposed).

Figure 8C:
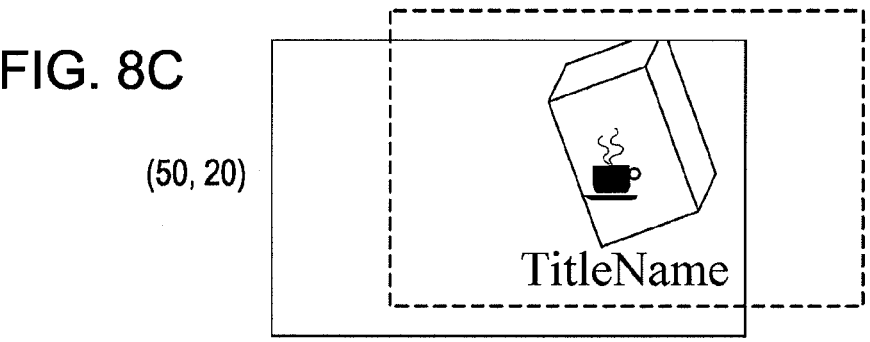

FIG. 8C shows a result that the foreground shown in FIG. 8B is superimposed (overlapped) based on position information (50, 20). However, the frame, marked with the broken line, of the superimposed (overlapped) image is not actually drawn. For convenience of description, the frame is marked with the broken. The cuboid placed in the background is an example of a CG generated drawing.

Figure 8D:
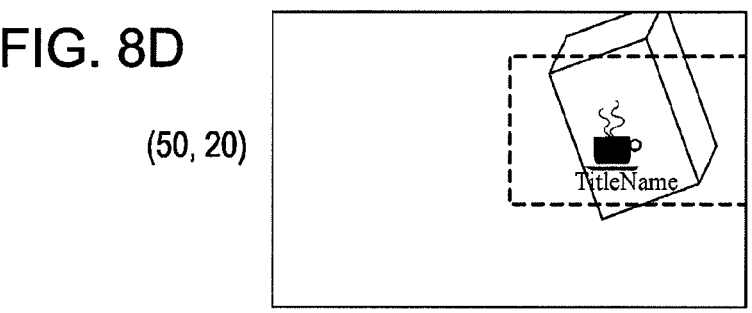

FIG. 8D shows a result that the foreground shown in FIG. 8B is superimposed based on the position information (50, 20). In this example, the foreground is reduced by 50%, moved and thereafter superimposed. This reduction is independently set by the synthesis switching operation input unit 195 or the like irrespective of the position information, and is performed by the synthesis switching control unit 190 controlling the key processor 176.

A calculation example of the position information in the image generation mechanism 140 will be described.

In this embodiment, as a texture map target face, a face of a CG object having a matching attribute value is specified. The position transmission mechanism 180 transmits a coordinate value for this face to the key processor 176, as the position information. The calculation of the coordinate value is performed as follows, for example.

Figure 9:
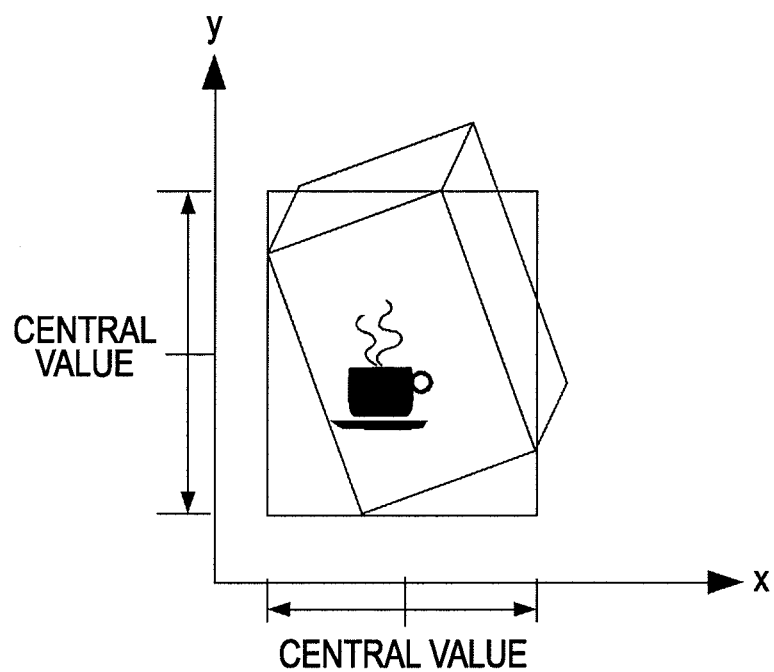
FIG. 9 is a diagram illustrating an example of a method of calculating the position information in the image generation mechanism.

Generally, the target face is not a simple tetragon as shown in FIGS. 8C and 8D, but is a more complicated 3D virtual space formed by polygon sets, each vertex forming the sets is projected onto the screen and displayed on certain coordinates. Although there are a number of coordinate values as the set of the vertices, a so-called bounding box as shown in FIG. 9 can be obtained by the maximum and the minimum of the respective x and y therein. The image generation mechanism 140 finds out the centers (coordinate values in the middle of the maximum and the minimum) of the bounding box as the position information.

Figure 10:
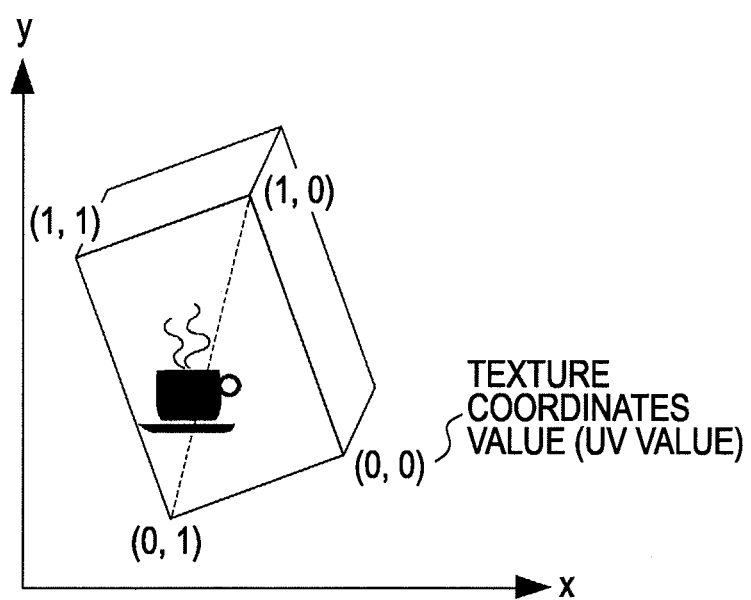
FIG. 10 is a diagram illustrating another example of a method of calculating the position information in the image generation mechanism.

Another example of the calculation method of the position information will be described. Each vertex in the polygon set for the target face is given texture coordinates when performing the texture map. The texture coordinates, as shown in FIG. 10, are also called UV coordinates or the like, and have values in a range from 0 to 1 along with U corresponding to x coordinate and V corresponding to y coordinate. A center of a texture map image is drawn at a position where the (U, V) coordinate value is exactly a point (0.5, 0.5). The image generation mechanism 140 calculates a coordinate value corresponding to a vertex of which the UV is exactly (0.5, 0.5), as the position information. When there are no points of which the UV is exactly (0.5, 0.5), an interpolation between vertices is performed, and a coordinate value corresponding to (0.5, 0.5) is determined.

Figure 11:
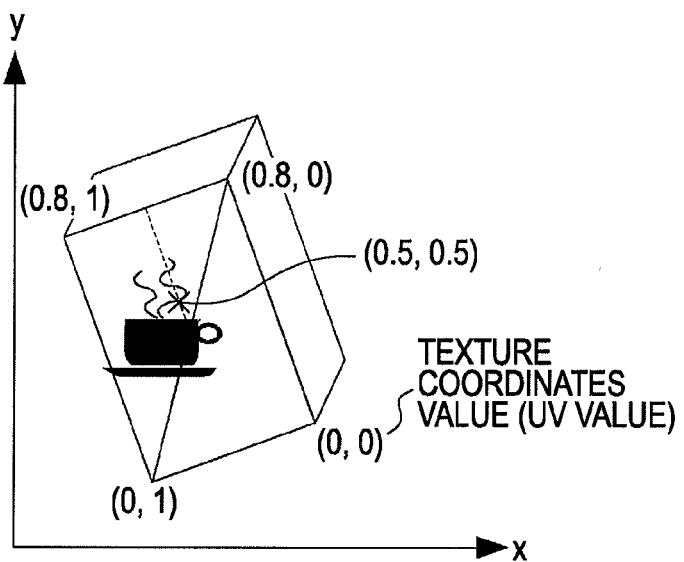
FIG. 11 is a diagram illustrating still another example of a method of calculating the position information in the image generation mechanism.

In FIG. 10 described above, a center of the line segment, which connects the vertex (0, 1) and the vertex (1, 0) in the texture coordinate value, is the point (0.5, 0.5) in the texture coordinate. In the case of FIG. 11, a center of the line segment, which connects the vertex (0, 1) and the vertex (0.8, 0) in the texture coordinate value, is the point (0.4, 0.5), and, a position where it is moved therefrom by only 0.1 (¼ to 0.8) in the U direction is the point (0.5, 0.5) in the texture coordinate value. In addition, the position in the polygon where the UV coordinate value is (0.5, 0.5) is not one. For this reason, in this scheme, when there are a number of such positions, one of them is resultantly treated as the position information.

For use in the superimposition, a certain value may be added to the position information calculated in the respective examples described above. For example, a position which is deviated downward or upward by a certain value is made to be an overlapped position. In addition, in the first example, a value (for example, about a half) obtained by multiplying height in the bounding box (a length in the y direction) by a fixed value may be added to a y value in a position information. This is the same for the x direction or the oblique direction.

When a value indicated by the position information exceeds the range of the screen (from −100 to +100), or, for example, when exceeding the range of −80 to +80, a correction may be made to be included in the range (when exceeding 100, it is made to be 100, etc.). Since the purpose is used in the superimposition, even when this simple correction (conversion) is made so as to be properly superimposed on the screen, the advantage of obtaining the position information from the image generation mechanism 140 is not varied.

An Operation Example of the Image Processing Device

An operation example of the image processing device 100 shown in FIG. 1 will be described.

The CG creation mechanism 110 generates CG description data for generating a predetermined CG image using the CG creation software. The CG description data generated by the CG creation mechanism 110 in this way is sent to the image generation mechanism 140 and surface designation mechanism 120 via the network 130.

In the surface designation mechanism (GUI) 120, an object or attribute values (names) given to the object in the CG description data are options, and a texture map target to which an input image is texture mapped is designated by an operation of an operator. This designation information (attribute values) is sent to the image generation mechanism 140 from the surface designation mechanism 120.

Here, a case will be described where the superimposition of a foreground on a CG image is set to ON in the CG output mode.

The image generation mechanism 140 generates a CG image which is a 3D spatial image, based on the CG description data created by the CG creation mechanism 110. In addition, as described above, the image generation mechanism 140 receives the designation information for the object or a part of the object which is a texture map target from the surface designation mechanism 120. The image generation mechanism 140 controls the image mapping mechanism 150 so that an input image (an image by the image data T1), which is supplied from the auxiliary output unit 160, is texture mapped to surfaces of the texture map target.

Under the control of the image generation mechanism 140, the image mapping mechanism 150 texture maps the image by the image data T1 obtained from the auxiliary output unit 160 to the surfaces of the texture map target. Image data Vout of the CG image where the image by the image data T1 is texture mapped to the surfaces of the texture map target, is output to an output terminal 140a which is derived from the image generation mechanism 140.

The image data Vout is input to the input line "9." As described above, the preliminary input bus 174 of the input selection unit 171 of the image synthesis switching unit 170 is connected to the input line "9" by the cross point switch group 175. Thereby, the above-described image data Vout of the CG image is extracted from the preliminary input bus 174, and the image data Vout is sent to the mixer 177 as background data.

In addition, the image generation mechanism 140 receives a request for the position information for the texture map target, and the position information is sent to the key processor 176 of the image synthesis switching unit 170 from the position transmission mechanism 180. The key processor 176 adjusts the movement of the superimposition image such as a character string which is superimposed on the CG image, based on the position information. In other words, the key fill signal and the key source signal are adjusted so that the superimposition image is superimposed at a position corresponding to the texture map target.

The key fill signal and the key source adjusted by the key processor 176 in this way is sent to the mixer 177. The mixer 177 superimposes the superimposition image such as a character string on the CG image which is the background image, by the use of the image data Vout of the CG image, the key fill signal, and the key source signal. In this case, the superimposition image is superimposed at a position corresponding to the texture map target in the CG image.

In addition, by an operator operating the synthesis switching operation input unit 195, image data extracted from other background A bus 172c and the background B bus 172d is also used for the synthesis processing in the mixer 177 as necessary. The image data generated by the mixer 177 is output to an external device as a final output, via the output line 178.

Next, an operation in the full screen mode will be described. In this case, the mixer 177 does not use image data sent from the preliminary input bus 174, that is, CG image data output from the image generation mechanism 140. In addition, the key processor 176 does not use the position information sent from the position transmission mechanism 180. In other words, the key processor 176 does not adjust the movement of the superimposition image. Alternatively, the key processor 176 adjusts the movement of the superimposition image in response to other movement instructions from the synthesis switching operation input unit 195.

The mixer 177 superimposes the superimposition image such as a character string on the background image, by the use of the background A data, the background B data, the key fill signal, and the key source signal. The image data generated by the mixer 177 is output to an external device as a final output via the output line 178.

Another operation example of the full screen mode will be described. In the full screen mode, the mixer 177 uses the image data sent from the preliminary input bus 174 unlike in the above-described operation example. However, the input lines connected to the preliminary input bus 174 is not the input line "9" to which CG image data is input from the image generation mechanism 140, but other input lines are connected thereto by an operation of an operator. In this case as well, the CG image data output from the image generation mechanism 140 is not used.

As described above, in both the CG output mode and the full screen mode, the same foreground image is superimposed. However, it is determined by only the operation of the CG mode switching mechanism 191 whether or not the superimposed position is made to match a position corresponding to a texture map target, thereby automatically working in conjunction with whether to use the CG image or not. This improves operability.

The image processing device 100 shown in FIG. 1 texture maps the texture map image to the surfaces of the texture map target. Also, the superimposition image such as a character string is superimposed on the CG image where the texture map image is texture mapped at a position corresponding to the texture map target, based on the position information of the texture map target. Therefore, in the image processing device 100, the character string or the like related to the texture map image can be inserted at the position corresponding to the image so as to be easily viewed.

Figure 12A:
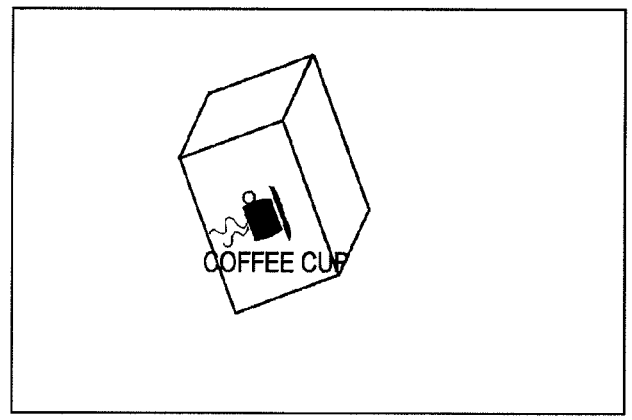
FIG. 12 is a diagram illustrating an example where a superimposition image of a character string is superimposed on a CG image to which a texture map image is texture mapped.
Figure 12B:
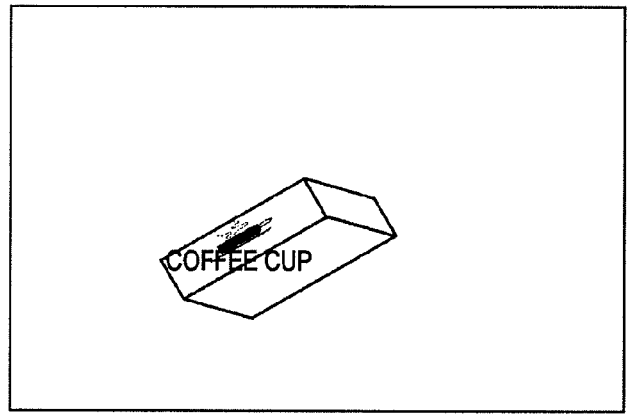

FIGS. 12A and 12B show examples where the superimposition image such as the character string is superimposed on the CG image where the texture map image is texture mapped. Although FIG. 12A shows that the texture map faces are rotated, the character string is inserted in the state of being established at a position corresponding to the texture map image. Also, although FIG. 12B shows that the texture map faces are reduced, the character string is inserted in the state of being established at a position corresponding to the texture map image without being reduced.

In the image processing device 100 shown in FIG. 1, one piece of image data selected from pieces of image data input to the nine input lines by the auxiliary output unit 160 is supplied for the image mapping mechanism 150 as the texture map image data T1. Thereby, an operator operates the synthesis switching operation input unit 195 to alter the image data extracted by the auxiliary output unit 160, thereby changing the texture map image into a desired image at any time.

Also, in the image processing device 100 shown in FIG. 1, any one selected from pieces of image data input to the nine input lines by the input selection unit 171 of the image synthesis switching unit 170 becomes superimposition image data (key fill signal, key source signal). Thereby, an operator operates the synthesis switching operation input unit 195 to alter the image data extracted by the input selection unit 171, thereby changing the superimposition image into a desired image at any time.

As to the operation in switching the CG output mode and the full screen mode, as described above, in addition to using the position information in the CG output mode only, the reduction may be performed according to an independently set reduction value. That is to say, in the CG output mode, a foreground image which will be superimposed is reduced at the set value and thereafter moved based on position information, for superimposition.

2. Second Embodiment

Configuration of an Image Processing Device

Figure 13:
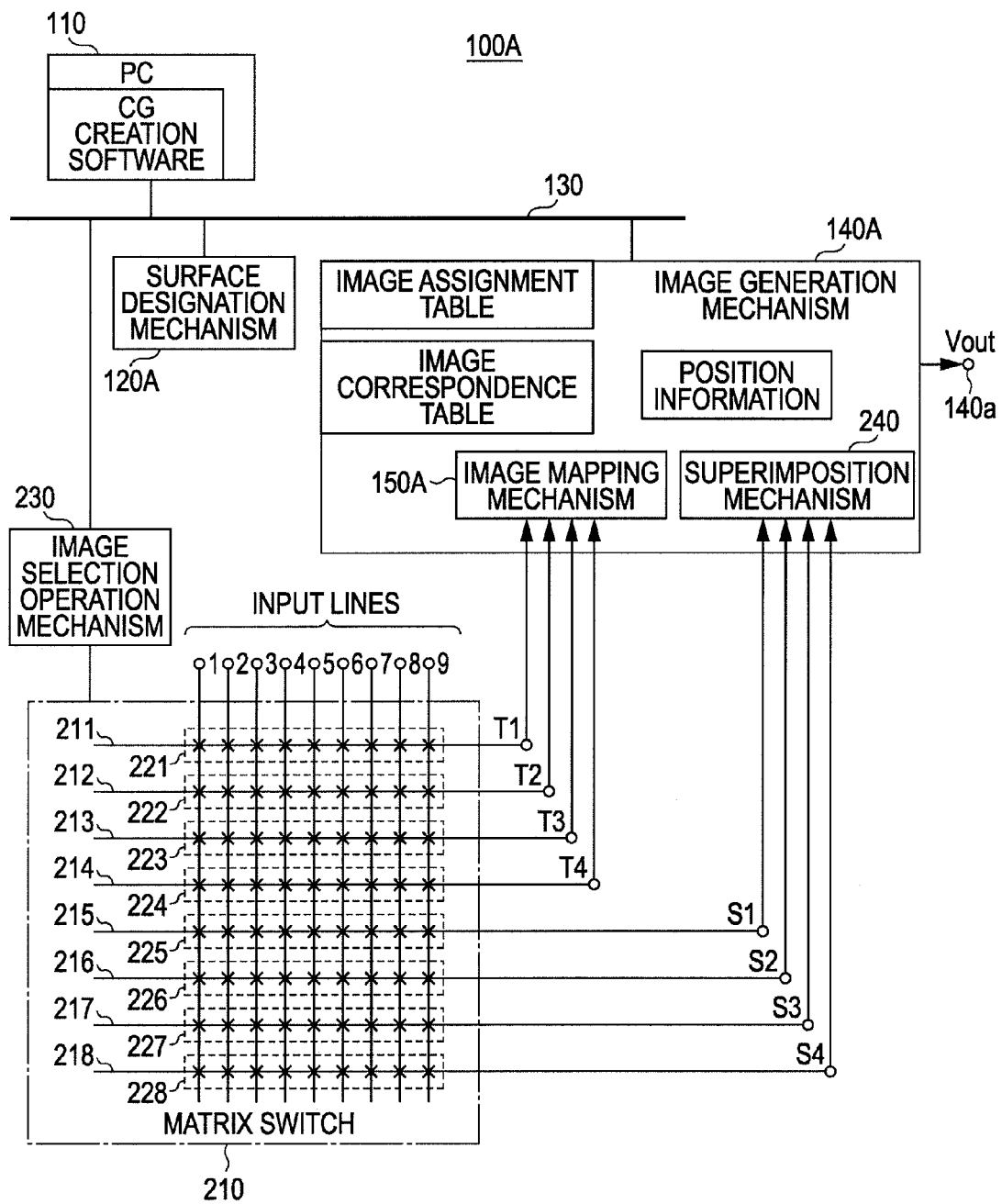
FIG. 13 is a block diagram illustrating a configuration example of an image processing device according to a second embodiment of the invention.

The second embodiment of the invention will be described. FIG. 13 shows a configuration example of an image processing device 100A according to the second embodiment. In FIG. 13, the same reference numerals are given to the elements corresponding to FIG. 1 and the description thereof will be omitted selectively.

The image processing device 100A includes a CG creation mechanism 110, a surface designation mechanism 120A, a network 130, an image generation mechanism 140A, and an image mapping mechanism 150A. Also, the image processing device 100A includes a matrix switch 210, an image selection operation mechanism 230, and a superimposition mechanism 240. The CG creation mechanism 110, the surface designation mechanism 120A, the image generation mechanism 140A, and the image selection operation mechanism 230 are respectively connected to the network 130.

The CG creation mechanism 110 is constituted by a PC (Personal Computer) installed with CG creation software. The CG creation mechanism 110 outputs CG description data with a specific format. The CG creation mechanism 110 is the same as the CG creation mechanism 110 of the image processing device 100 shown in FIG. 1.

The matrix switch 210 forms an image selection mechanism which selectively extracts image data from plural pieces of input image data. The matrix switch 210 includes nine input lines, eight output bus lines 211 to 218, and cross point switch groups 221 to 228. The output bus lines 211 to 214 are bus lines for supplying texture map image data T1 to T4 for the image mapping mechanism 150A. In addition, the output bus lines 215 to 218 are bus lines for supplying superimposition image data S1 to S4 for the superimposition mechanism 240.

The nine input lines are arranged in one direction in the figure. Image data is input to each of the input lines "1" to "9" from a VTR, a video camera or the like. The eight output bus lines 211 to 218 are arranged in other direction intersecting the input lines. The cross point switch groups 221 to 224 enables the nine input lines and the bus lines 211 to 214 to be connected to each other at the respective cross point where the both intersect each other. An image selection operation by a user controls the connection of the cross point switch groups 221 to 224 so that any one of pieces of image data input to the nine input lines is selectively output to the output bus lines 211 to 214. The output bus lines 211 to 214 constitutes output lines for the texture map image data (mapping input) T1 to T4.

In addition, the cross point switch groups 225 to 228 enables the nine input lines and the output bus lines 215 to 218 to be connected to each other at the respective cross point where the both intersect each other. An image selection operation by a user controls the connection of the cross point switch groups 225 to 228 so that any one of pieces of image data input to the nine input lines is selectively output to the output bus lines 215 to 218. The output bus lines 215 to 218 constitute output lines for the superimposition image data S1 to S4. On/Off operation of each cross point switch of the cross point switch group 221 to 228 changes the image data formed by consecutive frame data, and thus is performed during the vertical blanking interval between the frames.

The image selection operation mechanism 230 receives an operation input of instruction for the matrix switch 210. The image selection operation mechanism 230 has a control panel 260 which includes button lines, which are pushed and are for operating On/Off of the switches in each cross point switch group of the matrix switch 210.

Figure 14:
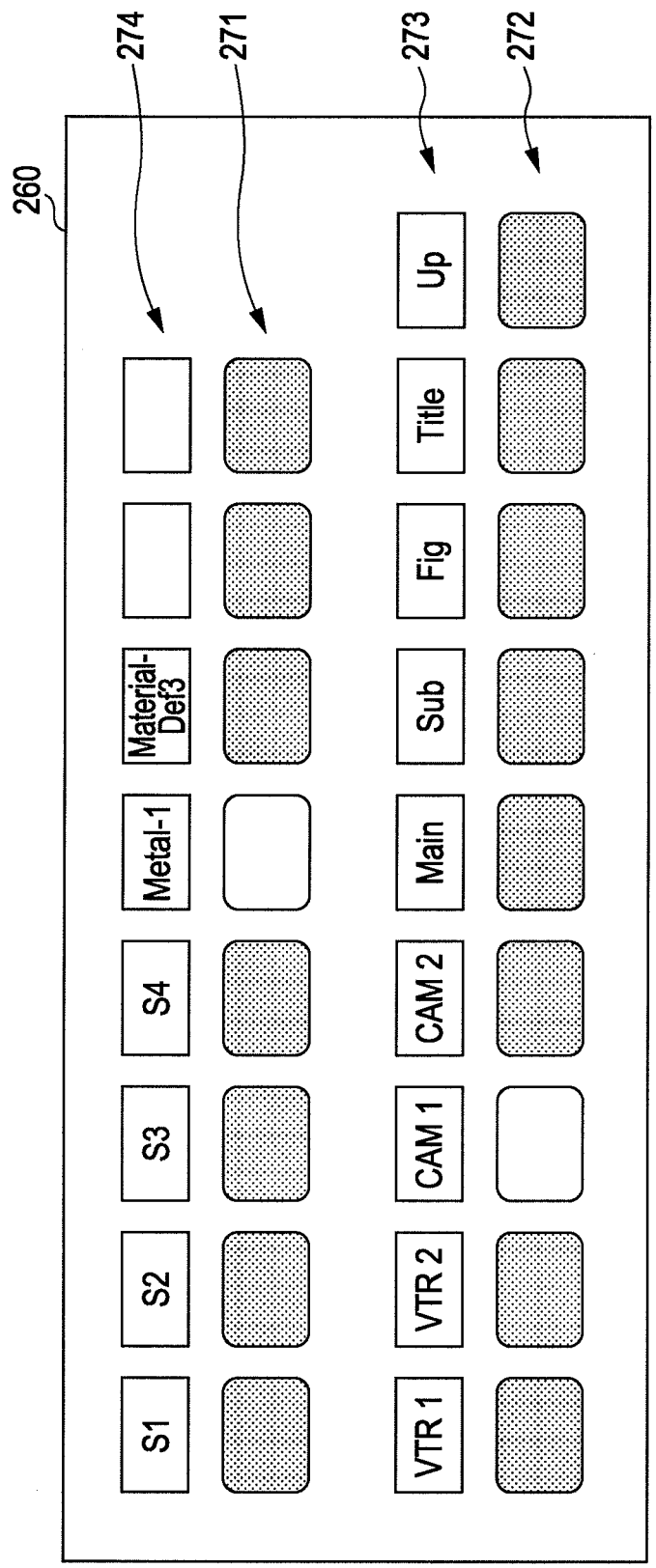
FIG. 14 is a diagram illustrating an appearance of an example of a control panel provided in an image selection operation mechanism.

FIG. 14 shows an appearance of an example of the control panel 260. The control panel 260 is provided with two push button lines 271 and 272 which extend in the transverse direction and are placed to be arranged up and down. The push button line 272 is used to operate On/Off of the switches in each cross point switch group of the matrix switch 210. The push button line 272 is constituted by alternative push buttons for selecting connections between the output bus lines corresponding to the respective nine input lines, and a selected push button lights up.

The control panel 260 is provided with a character display unit 273 corresponding to the push button line 272. The character display unit 273 displays characters for identifying images input to the respective input lines. The character display unit 273 is constituted by a display device, for example, an LCD (Liquid Crystal Display).

The push button line 271 is a designation button line, and is used to designate that the push button line 272 is used to select image data of which bus line. The push button line 271 is constituted by alternative push buttons and a selected push button is light up. The control panel 260 is provide with a character display unit 274 corresponding to the push button line 271. The character display unit 274 displays characters indicating that the respective push buttons of the push button line 271 are used to select image data of which output bus line. The character display unit 274 is constituted by a display device, for example, an LCD.

Whether the respective push buttons of the push button line 271 are used to select image data of which output bus line is implemented by, for example, a GUI (Graphical User Interface). FIG. 15A shows a GUI display example displayed at the time of assigning the push button line (designation button line) 271. In this GUI display, the eight push buttons of the push button line 271 are denoted by "1" to "8." An operator operates "Select buttons" corresponding to "1" to "8," displays an option for the output bus lines, selects a desired output bus line in the option, and thus can assign a desired output bus line to each push button.

FIG. 15B shows a GUI display example displayed at the time of selecting the output bus line. In this GUI display, the output bus lines 215 to 218 constituting the output lines of the superimposition image data S1 to S4 are displayed as an option by "S1" to "S4." In addition, in this GUI display, predetermined attribute values (names) are displayed as an option so as to assign the push buttons to the output bus lines 211 to 214 constituting the output lines of the texture map image data (mapping input) T1 to T4. For the attributes, an arbitrary attribute is set from, for example, material definitions, or surface information belonging to the material definitions, by an operation of an operator. Here, the operator sets an attribute for designating a texture map target (object or a part of the object). Alternatively, one attribute may be set in the system in advance.

The image selection operation mechanism 230 extracts the set attribute value (name) from the CG description data generated by the CG creation mechanism 110, and displays it as an option in the GUI display. The GUI display example in FIG. 15B shows that the material definition is set as an attribute, and the name of the material definition is displayed as an option. In the GUI display example, "Metal-1", "Metal-2", "Material-Def1", "Material-Def2", and "Material-Def3" are names of material definitions.

In the GUI display example in FIG. 15A, "S1" to "S4" are selected with respect to "1" to "4." Also, "Metal-1" and "Material-Def3" are selected with respect to "5" and "6." None is selected with respect to "7" and "8."

As described above, the matrix switch 210 includes the eight output bus lines, and the respective output bus lines are specified by the bus numbers "1" to "8." Also, as described above, the output bus lines with bus numbers 1 to 4 of the matrix switch 210 make the mapping inputs (texture map image data) T1 to T4 input to the image mapping mechanism 150A. The image selection operation mechanism 230 or its peripheral microcomputer stores these line-connection states, and has a mapping input correspondence table as shown in FIG. 16. The mapping input correspondence table is stored as a setting corresponding to the line-connections, and is not changed as long as the line-connections are not altered.

Like "5" and "6" in FIG. 15A, when a specific attribute value (name) is selected for a certain push button, the image selection operation mechanism 230 assigns the push button to the output bus line where the assignment has not been performed yet in the bus numbers 1 to 4. In this case, the output bus line is an output bus line for outputting image data of an image which is texture mapped to surfaces of an object or a part of the object which has the selected specific attribute value (name). The image selection operation mechanism 230 sends to the surface designation mechanism 120A via the network 130, information for the selected specific attribute value (name) and information for which one of the mapping inputs T1 to T4 a mapping input by the assigned output bus line is.

As shown in FIG. 15A, a case where "Metal-1" is selected for "5" and thereafter "Material-Def3" is selected for "6" will be described as an example.

First, when "Metal-1" is selected for "5," the image selection operation mechanism 230 assigns the push button "5" to the output bus line 211. The output bus line 211 becomes an output bus line for outputting image data of an image which is textured mapped to surfaces of an object or a part of the object which will be a texture map target corresponding to the material definition "Metal-1." The image selection operation mechanism 230 sends information for the material definition "Metal-1" and the mapping input T1 to the surface designation mechanism 120A via the network 130.

Next, when "Material-Def3" is selected for "6," the image selection operation mechanism 230 assigns the push button "6" to the output bus line 212. The output bus line 212 becomes an output bus line for outputting image data of an image which is textured mapped to surfaces of an object or a part of the object which will be a texture map target corresponding to the material definition "Material-Def3."The image selection operation mechanism 230 sends information for the material definition "Material-Def3" and the mapping input T2 to the surface designation mechanism 120A via the network 130.

In the above description, only one specific attribute value (name) is selected with respect to the buttons in the push button line 271. However, several specific attribute values (names) may be selected a certain button. In this case, an object or a part of the object corresponding to the selected plural attribute values becomes a texture map target, and an image by image data output from the output bus line to which the certain button is assigned, is texture mapped to its surfaces. In this case, the plural attribute values (names) are displayed in the character display unit 274 corresponding to the certain button. However, if the plural attribute values (names) are difficult to be displayed, one or a possible quantity may be displayed.

The surface designation mechanism 120A creates, as described above, an image assignment table indicating a correspondence relation between the attribute values (names) and the mapping inputs, based on the correspondence information of the selected attribute values (names) and the mapping inputs sent from the image selection operation mechanism 230. The surface designation mechanism 120A sets the image assignment table in the image generation mechanism 140A via the network 130.

By setting the image assignment table in this way, the surface designation mechanism 120A designates texture map targets to which images by the mapping inputs are texture mapped for the respective output bus lines which output the mapping inputs T1 to T4. In this case, the texture map targets (object or a part of the object) to which the images by the mapping inputs are texture mapped are designated by the attribute values (names).

FIG. 17A shows an example of the image assignment table. This example, as described above, shows the case where "Metal-1" is selected for "5" and "Material-Def3" is selected for "6" in the image selection operation mechanism 230, as shown in FIG. 15A. The FIG. 17B shows another example of the image assignment table. This example, as described above, shows a case where "Metal-1" and "Material-Def1" are selected for "5" and "Material-Def3" is selected for "6" in the image selection operation mechanism 230. T1 to T4 constitute image identifiers in the image assignment table.

In the image processing device 100A in FIG. 13, four families of image data T1 to T4 are sent to the image mapping mechanism 150A from the output bus lines 211 to 214 of the matrix switch 210. Also, in the image processing device 100A in FIG. 13, four families of image data S1 to S4 are sent to the superimposition mechanism 240 from the output bus lines 215 to 218 of the matrix switch 210. The surface designation mechanism 120A creates a correspondence relation between the texture map images and the superimposition images, and sets an image assignment table indicating this correspondence relation in the image generation mechanism 140A via the network 130. The surface designation mechanism 120A, for example, enables an operator to select superimposition image data corresponding to the texture map image data T1 to T4 from the superimposition image data S1 to S4, so as to create the correspondence relation.

FIGS. 18A to 18F show examples of image correspondence tables. In FIG. 18A, the image data T1 corresponds to the image data S1. In this correspondence, when an image by the image data T1 is texture mapped to surfaces of a texture map target corresponding thereto, an image by the image data S1 is superimposed at a position corresponding to the texture mapped image.

In FIG. 18B, the image data T1 corresponds to the image data S1 and S2. In this correspondence, when an image by the image data T1 is texture mapped to surfaces of a texture map target corresponding thereto, images by the image data S1 and S2 are superimposed at a position corresponding to the texture mapped image.

In FIG. 18C, the image data T1 corresponds to the image data S1, and the image data T4 corresponds to the image data S2. In this correspondence, when an image by the image data T1 is texture mapped to surfaces of a texture map target corresponding thereto, an image by the image data S1 is superimposed at a position corresponding to the texture mapped image. Also, when an image by the image data T4 is texture mapped to surfaces of a texture map target corresponding thereto, an image by the image data S2 is superimposed at a position corresponding to the texture mapped image.

In FIG. 18D, each of the image data T1 to T4 corresponds to the image data S1. In this correspondence, when images by the image data T1 to T4 are texture mapped to surfaces of texture map targets corresponding thereto, an image by the image data S1 is superimposed on positions corresponding to the texture mapped images.

In FIG. 18E, the image data T1 corresponds to the image data S1 and S2, and the image data T3 corresponds to the image data S2. In this correspondence, when an image by the image data T1 is texture mapped to surfaces of a texture map target corresponding thereto, images by the image data S1 and S2 are superimposed at a position corresponding to the texture mapped image. Also, when an image by the image data T3 is texture mapped to surfaces of a texture map target corresponding thereto, an image by the image data S2 is superimposed at a position corresponding to the texture mapped image.

In FIG. 18F, the image data T3 corresponds to the image data S1 to S4. In this correspondence, when an image by the image data T3 is texture mapped to surfaces of a texture map target corresponding thereto, images by the image data S1 to S4 are superimposed at a position corresponding to the texture mapped image.

The image generation mechanism 140A generates a CG image which is a 3D spatial image on the basis of the CG description data created by the CG creation mechanism 110. When the image generation mechanism 140A reads the CG description data to fully analyze, it stores information for the respective definitions or the like in a memory, and stores the correspondence thereof as a data structure. Also, the image generation mechanism 140A stores various values in the key frame in the memory.

For example, in order to draw polygon sets which are present in the geometry information for a certain node, the material definition corresponding to the geometry information is referred to, and the drawing is made according to the designation of its colors or the like. In the case of animation, a current time is progressed for each frame, each value in before and after key frames is interpolated to be determined, and then the drawing is made.

The image assignment table is set in the image generation mechanism 140A by the surface designation mechanism 120A as described above (refer to FIG. 17). The image generation mechanism 140A controls the image mapping mechanism 150A based on the image assignment table. In this case, the image generation mechanism 140A controls such that an image by the mapping input which forms a pair with the attribute value (name) is texture mapped to surfaces of the texture map target having each attribute value present in the table.

As described above, the image correspondence table is set in the image generation mechanism 140A by the surface designation mechanism 120A (refer to FIG. 18A to FIG. 18F). The image generation mechanism 140A controls the superimposition mechanism 240 based on the image correspondence table. In this case, the image generation mechanism 140A controls such that when an image by the texture map image data present in the table is mapped, an image by the superimposition image data which forms a pair with the image data is superimposed.

The image mapping mechanism 150A performs the texture map for surfaces of a polygon designated by the surface designation mechanism 120A, among polygons drawn by the image generation mechanism 140A. In this case, the image mapping mechanism 150A texture maps an image by the mapping input which forms a pair with the attribute value (name) to surfaces of a texture map target having each attribute value present in the image assignment table. The image mapping mechanism 150A is installed as a single body with the image generation mechanism 140A, and is implemented by control due to software installed in a CPU and working due to hardware such as a GPU. The control software designates a polygon set undergoing the texture map and notifies the hardware of it.

The superimposition mechanism 240 superimposes the superimposition image on the CG image for which the texture map has been performed in the image mapping mechanism 150A. In this case, when an image by the texture map image data present in the image correspondence table is texture mapped, the superimposition mechanism 240 superimposes an image by the superimposition image data which forms a pair with the image data.

In the same manner as the image generation mechanism 140 of the image processing device 100 shown in FIG. 1, the image generation mechanism 140A calculates position information for targets to which images by the respective image data T1 to T4 are texture mapped in the image mapping mechanism 150A (refer to FIGS. 9 to 11). The superimposition mechanism 240 superimposes an image by the superimposition image data at a position corresponding to the texture map target based on the position information for the texture map target. The superimposition mechanism 240 is installed with the above image generation mechanism 140A as a single body.

An operation input mechanism may be installed to operate on and off of the superimposition for each superimposition image data. When the corresponding texture map is performed, whether or not the superimposition is performed may be instructed manually.

Operation Examples of the Image Processing Device

Operation examples of the image processing device 100A shown in FIG. 13 will be described. The CG creation mechanism 110 generates CG description data for generating a predetermined CG image using the CG creation software. The CG description data generated by the CG creation mechanism 110 in this way is sent to the image generation mechanism 140A and the image selection operation mechanism 230 via the network 130.

The image selection operation mechanism 230 assigns the buttons in the push button line (designation button line) 271 of the control panel 260 to the output bus lines 211 to 214 constituting the output lines of the image data (mapping inputs) T1 to T4, by an operation of an operator. In this case, the selection of a specific attribute value (name) enables the output bus lines to be sequentially assigned from the output bus line 211.

The image selection operation mechanism 230 sets an attribute for designating a texture map target (object or a part of the object) by the operation of the operator. Here, the attribute is a material definition or surface information belonging to the material definition. The above-described specific attribute is an attribute set by the operation of the operator in this way, and the selected attribute value (name) is extracted from the CG description data generated by the CG creation mechanism 110.

In the output bus lines 211 to 214 of the matrix switch 210, regarding the output bus lines to which the buttons in the push button line 271 of the control panel 260 may be assigned, pieces of image data (mapping inputs) output therefrom can be changed by operating the push button line 272. In this case, as the output image data, one of pieces of image data input to the nine input lines is selectively output.

When the button in the push button line 271 of the control panel 260 can be assigned to one of the output bus lines 211 to 214 by the image selection operation mechanism 230, the information is sent to the surface designation mechanism 120A from the image selection operation mechanism 230 via the network 130. This information includes information for the selected specific attribute value (name) and information for which one of the mapping inputs T1 to T4 a mapping input by the assigned output bus line is.

The surface designation mechanism 120A sets an image assignment table indicating a correspondence relation between the attribute values (names) and the mapping inputs, based on the selected attribute values (names) and the mapping inputs sent from the image selection operation mechanism 230 (refer to FIG. 17). The image assignment table is set in the image generation mechanism 140A via the network 130. The surface designation mechanism 120A sets the image assignment table and thereby a target where an image by each mapping input is texture mapped (an object or a part of the object) is designated by the attribute value (name).

Also, the surface designation mechanism 120A creates a correspondence relation between the texture map images and the superimposition images, and sets an image assignment table indicating this correspondence relation in the image generation mechanism 140A via the network 130. In this case, the surface designation mechanism 120A, for example, enables an operator to select superimposition image data corresponding to the texture map image data T1 to T4 from the superimposition image data S1 to S4, so as to create the correspondence relation.

The image generation mechanism 140A generates a CG image which is a 3D spatial image, based on the CG description data created by the CG creation mechanism 110. The image assignment table, as described above, is set in the image generation mechanism 140A by the surface designation mechanism 120A. Under the control of the image generation mechanism 140A, the texture map is performed in the image mapping mechanism 150A. That is to say, the image mapping mechanism 150A texture maps an image by the mapping input which forms a pair with the attribute value (name) to surfaces of a texture map target having each attribute value (name) present in the image assignment table.

As described above, the image correspondence table is set in the image generation mechanism 140A by the surface designation mechanism 120A. The superimposition mechanism 240 superimposes the superimposition image on the CG image for which the texture map has been performed in the image mapping mechanism 150A, under the control of the image generation mechanism 140A. In other words, when an image by the texture map data present in the image correspondence table is texture mapped, the superimposition mechanism 240 superimposes an image by the superimposition image data which forms a pair with the image data.

The image generation mechanism 140A calculates position information for a texture map target in the CG images. The superimposition mechanism 240 superimposes an image by the superimposition image data at a position corresponding to the texture map target, based on the position information for the texture map target. The CG image data Vout where the texture map image is texture mapped and also the superimposition image related to a position corresponding to the texture mapped image is superimposed, is output to an output terminal 140*a* which is derived from the image generation mechanism 140A.

A flowchart in FIG. 19 shows processing steps corresponding to one frame in the image mapping mechanism 150A.

The image mapping mechanism 150A starts a processing at step ST1, and then enters step ST2. At step ST2, the image mapping mechanism 150A receives the information for the selected attribute value for each input image from the image generation mechanism 140A. This information, as described above, is present in the image assignment table set in the image generation mechanism 140A.

At step ST3, the image mapping mechanism 150A sets the image input number i to 1. At step ST4, the image mapping mechanism 150A texture maps i-th input image T1 to surfaces of a CG object or a part of the CG object (texture map target) consistent with the attribute value. At step ST5, the image mapping mechanism 150A sends the coordinate Pi on the screen of the face where the texture map has been performed, to the superimposition mechanism 240 as the position information. In addition, the image mapping mechanism 150A does not perform the processings at steps ST4 and ST5 for the i-th input image Ti when an attribute value for the i-th input image Ti is not selected.

At step ST6, the image mapping mechanism 150A determines whether or not the input number i is smaller than the input value. When the input number i is smaller than the input value, the processing for all the texture map input images is not completed, so the image mapping mechanism 150A increases the input number i at ST7, and then returns to step ST4. On the other hand, when the input number i is equal to or more than the input value, the processing for all the texture map input images is completed, so the image mapping mechanism 150A finishes the processing at ST8.

Figure 20:
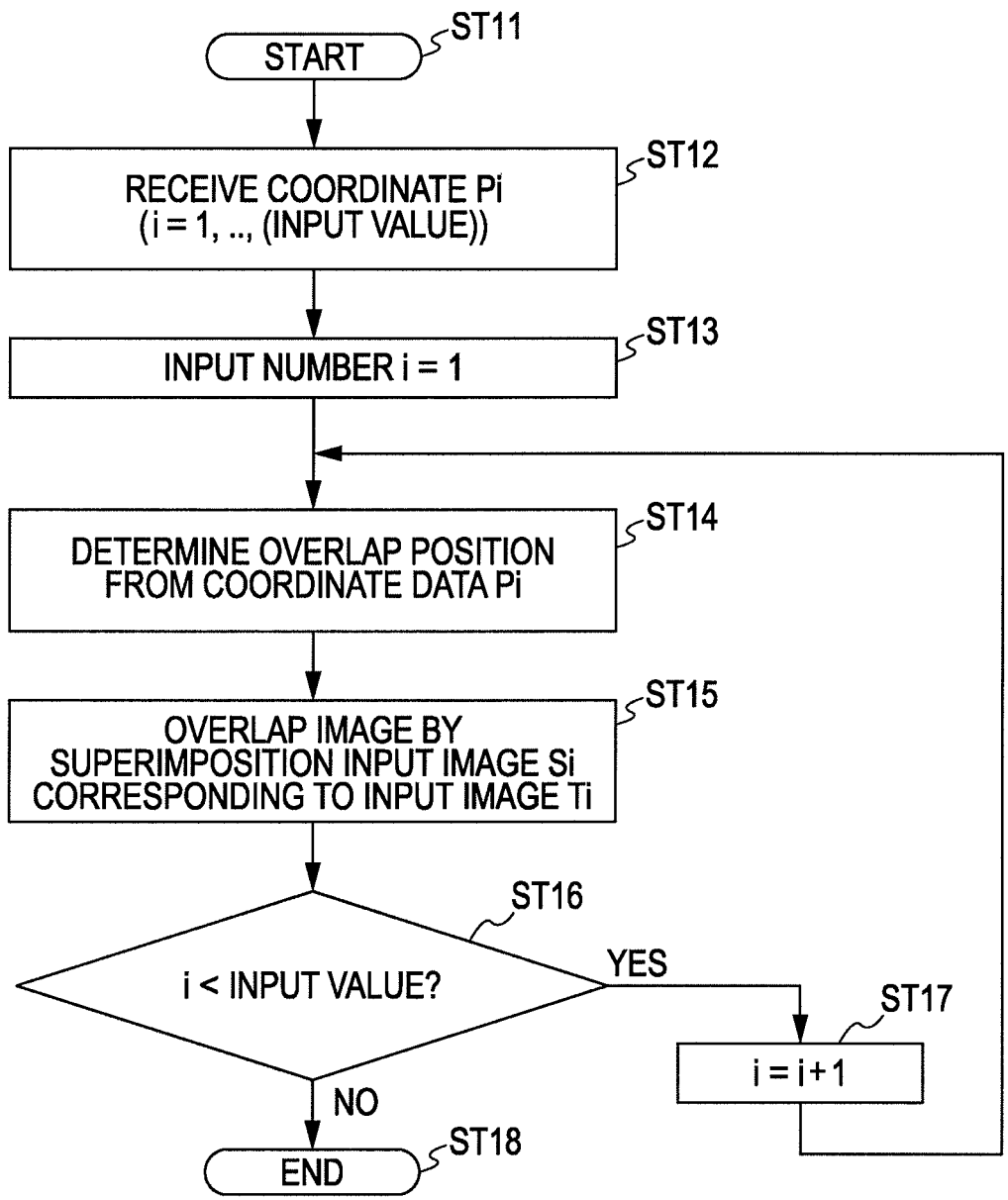
FIG. 20 is a flowchart illustrating processing steps corresponding to one frame in the superimposition mechanism.

FIG. 20 is a flowchart illustrating processing steps corresponding to one frame in the superimposition mechanism 240.

The superimposition mechanism 240 starts the processing at ST11, and then enters step ST12. At ST12, the superimposition mechanism 240 receives the coordinate Pi (where i= 1, . . . , (input value)) from the image mapping mechanism 150A.

At ST13, the superimposition mechanism 240 sets the input number i to 1. At ST14, the superimposition mechanism 240 decides a superimposition position (overlap position) based on the coordinate Pi. At ST15, the superimposition mechanism 240 superimposes an image by the superimposition input image corresponding to the input image Ti on the overlap position decided at step ST14.

At step ST16, the superimposition mechanism 240 determines whether or not the input number i is smaller than the input value. When the input number i is smaller than the input value, the processing for all the texture map input images is not completed, so the superimposition mechanism 240 increases the input number i at ST17, and then returns to step ST14. On the other hand, when the input number i is equal to or more than the input value, the processing for all the texture map input images is completed, so the superimposition mechanism 240 finishes the processing at ST18.

In the examples shown in FIGS. 19 and 20, the calculation for the coordinate Pi is performed along with the drawing (texture map) in the image generation mechanism 140A. However, an installment method different from this is possible.

Figure 21:
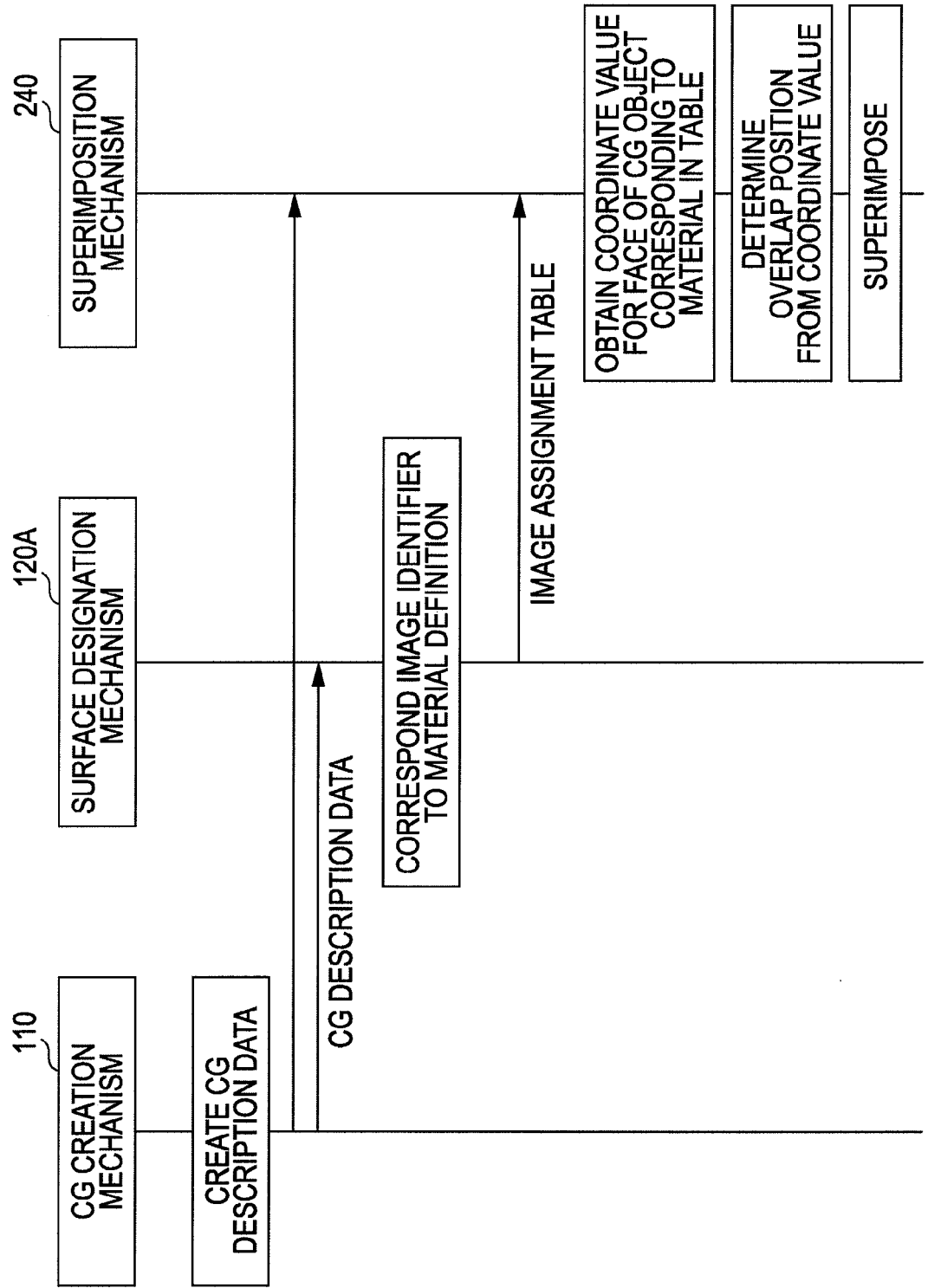
FIG. 21 is a sequence diagram illustrating communication and so on when the calculation for the coordinate is performed by a unit (independent microcomputer) other than the image mapping mechanism.

FIG. 21 is a sequence diagram illustrating communication and so on when the calculation for the coordinate is performed by a unit (independent microcomputer) other than the image mapping mechanism 150A. The CG description data created by the CG creation mechanism 110 is sent to the surface designation mechanism 120A and the superimposition mechanism 240.

The surface designation mechanism 120A, for example, makes the image identifiers and the material definitions to correspond to each other and creates the image assignment table. This image assignment table is sent to the image generation mechanism 140A and is used for an operation of the image generation mechanism along with the CG description data. In this example, the image assignment table is sent to the superimposition mechanism 240.

The superimposition mechanism 240 receives the CG description data and the image assignment table, and obtains a coordinate value for a face of a CG object corresponding to a material definition, by the same processing as the image generation mechanism 140A and the image mapping mechanism 150A thereof.

The superimposition mechanism 240 does not perform position calculations for other faces which are unnecessary. The superimposition mechanism 240 performs the superimposition based on the obtained coordinate value, in the same manner as the processing order in FIG. 20. That is to say, whether which microcomputer calculates the position (coordinate) may be properly altered in an embodiment of the invention.

When the drawing processing in the image generation mechanism 140A is time variant like animation operation or the like, it sends the same information to the superimposition mechanism 240 to operate by the same parameters. If not doing so, for example, in the animation operation, the processing for different times is performed and thus the position becomes different.

The image processing device 100A shown in FIG. 13 texture maps the texture map image to the surfaces of the texture map target. Also, the superimposition image such as a character string is superimposed on the CG image where the texture map image is texture mapped at a position corresponding to the texture map target, based on the position information for the texture map target. Therefore, in the image processing device 100A, like the image processing device 100 shown in FIG. 1, the character string or the like related to the texture map image can be inserted into at the position corresponding to the image so as to be easily viewed.

In the image processing device 100A shown in FIG. 13, the image correspondence table indicating the correspondence relation between the texture map images and the superimposed images is set in the image generation mechanism 140A by the surface designation mechanism 120A. The superimposition mechanism 240 decides an image which will be superimposed at a position corresponding to the texture map image, based on the correspondence relation. Therefore, even when there are plural families of the texture map images or the superimposition images, the superimposition images such as the character string related to the texture map image can be conveniently inserted at the position corresponding to the texture map image so as to be easily viewed.

In the image processing device 100A shown in FIG. 13, image data selectively extracted from by the matrix switch 210 is supplied for the image mapping mechanism 150A as the texture map image data T1 to T4. Thereby, an operator operates the image selection operation the mechanism 230 to alter the image data T1 to T4 extracted by the matrix switch 210, thereby changing the texture map image into a desired image at any time.

Also, in the image processing device 100A shown in FIG. 13, one piece of image data selected from the nine input lines by the matrix switch 210 becomes superimposition image data S1 to S4. Thereby, an operator operates the image selection operation mechanism 230 to alter the image data S1 to S4 extracted by matrix switch 210, thereby changing the superimposition image into a desired image at any time.

3. Third Embodiment

Configuration of an Image Processing Device

Figure 22:
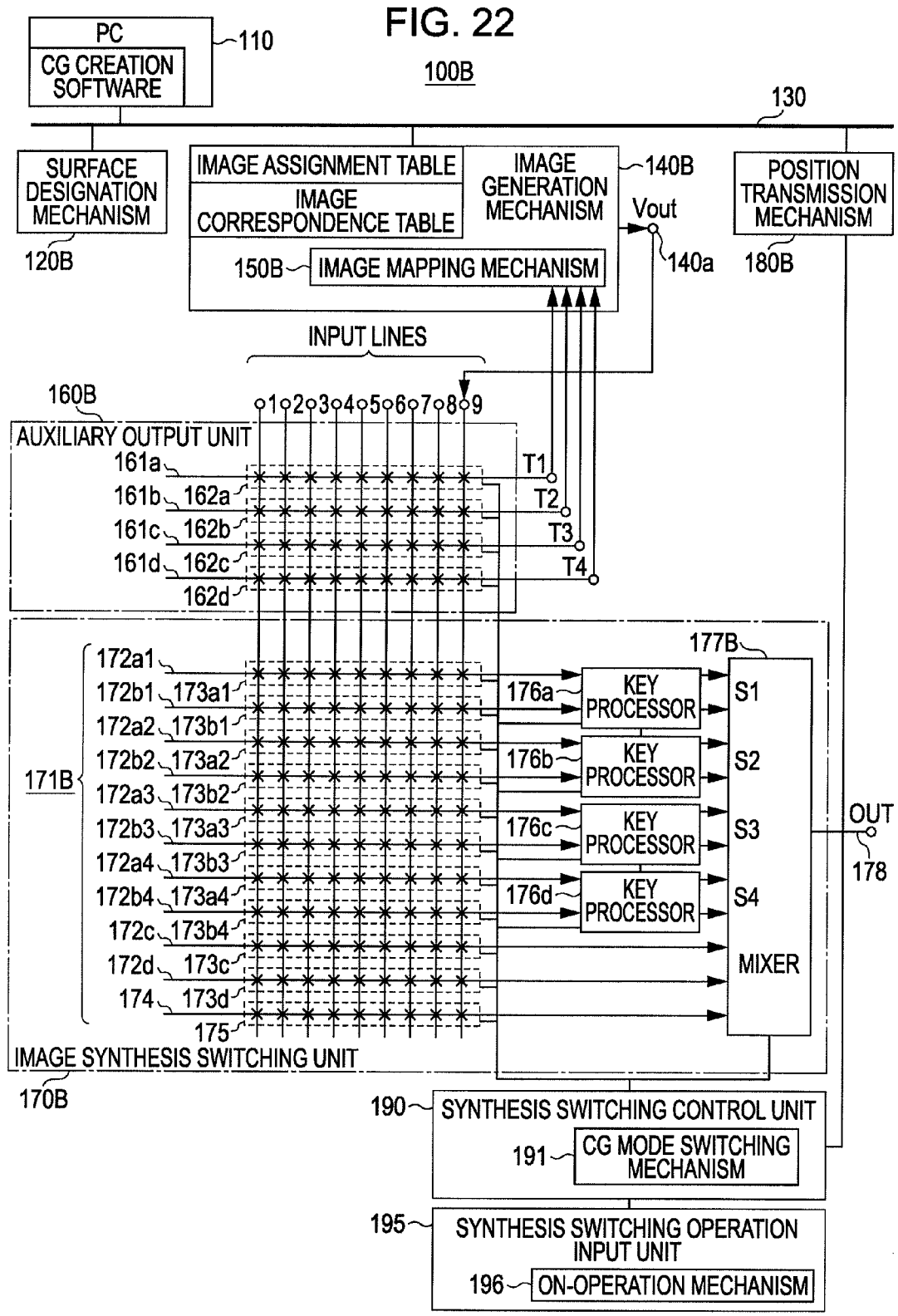
FIG. 22 is a block diagram illustrating a configuration example of an image processing device according to a third embodiment.

The third embodiment of the invention will be described. FIG. 22 shows a configuration example of an image processing device 100B according to the third embodiment of the invention. In FIG. 22, the same reference numerals are given to the elements corresponding to FIG. 1 and the description thereof will be omitted selectively.

The image processing device 100B includes a CG creation mechanism 110, a surface designation mechanism 120B, a network 130, an image generation mechanism 140B, and an image mapping mechanism 150B. Also, the image processing device 100B includes an auxiliary output nit 160B, an image synthesis switching unit 170B, a position transmission mechanism 180B, a synthesis switching control unit 190, and a synthesis switching operation input unit 195. The CG creation mechanism 110, the surface designation mechanism 120B, the image generation mechanism 140B, and the position transmission mechanism 180B are respectively connected to the network 130.

The image synthesis switching unit 170B includes an input selection unit 171B, key processors 176a to 176d, and a mixer 177B. The above-described image synthesis switching unit 170B of the image processing device 100 in FIG. 1 has a single superimposition functional unit (keying). In other words, the image synthesis switching unit 170B has one key processor 176, and the key source bus 172a and the key fill bus 172b are connected to this key processor 176.

The image synthesis switching unit 170B has four superimposition functional units (keying), that is, four key processors 176a, 176b, 176c and 176d. The key processor 176a is connected to a key source bus 172a1 and a key fill bus 172b1, and the key processor 176b is connected to a key source bus 172a2 and a key fill bus 172b2. Also, the key processor 176c is connected to a key source bus 172a3 and a key fill bus 172b3, and the key processor 176d is connected to a key source bus 172a4 and a key fill bus 172b4. The input selection unit 171B is provided with cross point switch groups 173a1 to 173*a*4 and 173*b*1 to 173*b*4, corresponding to the respective key source buses and the respective key fill buses.

The mixer 177B superimposes a foreground image on a background image or a CG image using the keying, based on the key fill signals and the key source signals from the respective key processors. Here, superimposition image data (foreground image data) related to the key processors 176*a*, 176*b*, 176*c* and 176*d* is referred to as S1, S2, S3, and S4, respectively. The image data obtained by the mixer 177B is output to an external device via the output line 178. The mixer 177B and the key processors 176*a* to 176*d* constitute a superimposition mechanism.

The remaining parts of the image synthesis switching unit 170B are configured in the same manner as the image synthesis switching unit 170 of the image processing device 100 in FIG. 1 described above.

The auxiliary output unit 160B selects an auxiliary output. The auxiliary output unit 160B enables the nine input lines where plural pieces of image data are input from an external device to be selectively connected to four auxiliary output selection buses 161*a*, 161*b*, 161*c* and 161*d*. Cross point switch groups 162*a*, 162*b*, 162*c* and 162*d* enable the nine input lines and the auxiliary output selection buses 161*a*, 161*b*, 161*c* and 161*d* to be connected to each other at the respective cross points where the both intersect each other. Image data extracted from the auxiliary output selection buses 161*a*, 161*b*, 161*c* and 161*d* is sent to the image mapping mechanism 150B as texture map image data T1, T2, T3 and T4. This auxiliary output unit 160B constitutes a texture map image data selection mechanism.

The surface designation mechanism 120B creates an image assignment table (refer to FIG. 17) indicating a correspondence relation between the attribute values (names) and the mapping inputs by, for example, an operation of an operator, and sets the image assignment table in the image generation mechanism 140B via the network 130. The surface designation mechanism 120B designates a texture map target where an image by the mapping input is texture mapped for each output bus line which outputs the mapping inputs T1 to T4 by setting the image assignment table in this way. In this case, a texture map target (an object or a part of the object) where an image by each mapping input is texture mapped is designated by the attribute value (name).

The surface designation mechanism 120B creates a correspondence relation between a texture map image and a superimposition image, and sets an image correspondence table (refer to FIG. 18) indicating this correspondence relation in the image generation mechanism 140B via the network 130. The surface designation mechanism 120B, for example, enables an operator to select superimposition image data corresponding to the texture map image data T1 to T4 from the superimposition image data S1 to S4, so as to create the correspondence relation. The pieces of superimposition image data S1 to S4 are superimposition image data related to the key processors 176*a* to 176*d*, respectively, as described above.

The image generation mechanism 140B generates a CG image which is a 3D spatial image on the basis of the CG description data created by the CG creation mechanism 110. When the image generation mechanism 140B reads the CG description data to fully analyze, it stores information for the respective definitions or the like in a memory, and stores the correspondence thereof as a data structure. The image generation mechanism 140B stores various kinds of values in a key frame for executing animation in the memory. The creation function of the CG image in the image generation mechanism 140B is the same as the creation function of the CG image in the image generation mechanism 140 of the image processing device 100 shown in FIG. 1, or the image generation mechanism 140A of the image processing device 100A shown in FIG. 13.

The image assignment table is set in the image generation mechanism 140B by the surface designation mechanism 120B as described above. The image generation mechanism 140B controls the image mapping mechanism 150B based on the image assignment table. In this case, the image generation mechanism 140B controls such that an image by the mapping input which forms a pair with the attribute value (name) is texture mapped to surfaces of the texture map target having each attribute value present in the table.

As described above, the image correspondence table is set in the image generation mechanism 140B by the surface designation mechanism 120B (refer to FIG. 18A to FIG. 18F). The image generation mechanism 140B sends a superimposition control signal to the synthesis switching control unit 190 via the position transmission mechanism 180B, based on the image correspondence table. The control signal controls such that when an image by the texture map image data present in the image correspondence table is texture mapped, an image by the superimposition image data which forms a pair with the image data is superimposed.

The image generation mechanism 140B calculates position information for targets (objects or parts of the object) to which images by the respective image data T1 to T4 are texture mapped in the image mapping mechanism 150B (refer to FIGS. 9 to 11). This is the same as the image generation mechanism 140 of the image processing device 100 shown in FIG. 1 described above, or the image generation mechanism 140A of the image processing device 100A shown in FIG. 13 described above. The image generation mechanism 140B sends this position information to the synthesis switching control unit 190 via the position transmission mechanism 180B.

The synthesis switching control unit 190 controls the key processors 176*a* to 176*d* based on the position information for the texture map target, and adjusts an overlap position for each superimposition image. The synthesis switching control unit 190 controls such that when a texture map image is texture mapped to a predetermined texture map target, a superimposition image indicated by the image correspondence table and corresponding to the mapped image is superimposed at a position corresponding to the mapped image.

The position transmission mechanism 180B, as described above, sends the superimposition control signal output from the image generation mechanism 140B to the synthesis switching control unit 190. In addition, the position transmission mechanism 180B, as described above, sends the position information calculated by the image generation mechanism 140B to the synthesis switching control unit 190. Separated from these, an operation input mechanism such as push buttons may be provided in the synthesis switching operation input unit 195 so as to operate and input the instruction of on and off related to S1 to S4, and on and off of the superimposition may be controlled manually. Whether the manual control for these is prioritized or the control depending on presence or absence of the texture map (the above-described control signal) is prioritized may be set according to the operations of the devices.

The remaining parts of the image processing device 100B in FIG. 22 is the same as the image processing device 100 shown in FIG. 1.

Operation Examples of the Image Processing Device

Operation examples of the image processing device 100B shown in FIG. 22 will be described. Here, a case will be described where the superimposition of a foreground on a CG image is set to On in the CG output mode.

The CG creation mechanism 110 generates CG description data for generating a predetermined CG image using CG creation software. The CG description data generated by the CG creation mechanism 110 in this way is sent to the image generation mechanism 140B and the surface designation mechanism 120B via the network 130.

The surface designation mechanism 120B sets an image assignment table indicating a correspondence relation between the attribute values (names) designating a texture map target and the mapping inputs (refer to FIG. 17). The image assignment table is set in the image generation mechanism 140B via the network 130. Also, the surface designation mechanism 120B creates a correspondence relation between the texture map images and the superimposition images, and sets an image correspondence table indicating this correspondence relation in the image generation mechanism 140B via the network 130.

The image generation mechanism 140B generates a CG image which is a 3D spatial image, based on the CG description data created by the CG creation mechanism 110. The image assignment table, as described above, is set in the image generation mechanism 140B by the surface designation mechanism 120B. Under the control of the image generation mechanism 1408, the texture map is performed in the image mapping mechanism 150B. That is to say, the image mapping mechanism 150B texture maps an image by the mapping input which forms a pair with the attribute value (name) to surfaces of a texture map target having each attribute value (name) present in the image assignment table.

Image data Vout of the CG images where the images by the image data T1 to T4 are texture mapped to the surfaces of the texture map target, is output to an output terminal 140a which is derived from the image generation mechanism 140B. The image data Vout is input to the input line "9." The preliminary input bus 174 of the input selection unit 171B of the image synthesis switching unit 170B is connected to the input line "9" by the cross point switch group 175. Thereby, the above-described image data Vout of the CG image is extracted from the preliminary input bus 174, and the image data Vout is sent to the mixer 177B as background data.

The mixer 177B superimposes the superimposition images by the superimposition image data S1, S2, S3 and S4 on a CG image, using the keying, based on the key fill signal and the key source signal from the respective key processors 176a to 176d. The image data obtained by the mixer 177B is output to an external device via the output line 178 as a final output.

In this case, the superimposition control signal is sent to the synthesis switching control unit 190 from the image generation mechanism 140B based on the image correspondence table. Thereby, when an image by texture map image data present in the image correspondence table is texture mapped to the CG image, an image by the superimposition image data which forms a pair with the mapped image data is superimposed thereon.

The image generation mechanism 140B calculates position information for targets (objects or parts of the object) to which images by the respective image data T1 to T4 are texture mapped in the image mapping mechanism 150B. The position information is sent to the synthesis switching control unit 190 from the image generation mechanism 140B via the position transmission mechanism 180B. The key processors 176a to 176d are controlled by the synthesis switching control unit 190 so as to adjust an overlap position for each superimposition image, based on the position information for the texture map target. Thereby, when the texture map image is texture mapped to a predetermined texture map target, the superimposition image corresponding to the mapped image indicated by the image correspondence table is superimposed at a position corresponding to the mapped image.

The image processing device 100B shown in FIG. 22 texture maps the texture map image to the surfaces of the texture map target. Also, in the image synthesis switching unit 170B, the superimposition image is superimposed on the CG image where the texture map image is texture mapped at a position corresponding to the texture map target, based on the position information for the texture map target. Therefore, in the image processing device 100B, like the image processing device 100 shown in FIG. 1 and the image processing device 100A shown in FIG. 13, the character string or the like related to the texture map image can be inserted at the position corresponding to the image so as to be easily viewed.

In the image processing device 100B shown in FIG. 22, the image correspondence table indicating the correspondence relation between the texture map images and the superimposed images is set in the image generation mechanism 140B by the surface designation mechanism 120B. The mixer 177B decides an image which will be superimposed at a position corresponding to the texture map image, based on the correspondence relation. Therefore, even when there are plural families of the texture map images or the superimposition images, the superimposition images related to the texture map image can be conveniently inserted at the position corresponding to the texture map image so as to be easily viewed.

The remaining parts of the image processing device 100B shown in FIG. 22 have the same configurations as the image processing device 100 shown in FIG. 1 and the image processing device 100A shown in FIG. 13, and thus the same effect can be achieved.

The superimposition function by the key processors 176a to 176d and the mixer 177B is not limited to the operation accompanied by the texture map, but is used for manually overlapping captions on the background image when the Vout, that is, the CG image is not employed in the image synthesis switching unit 170B.

4. Fourth Embodiment

Configuration of an Image Processing Device

Figure 23:
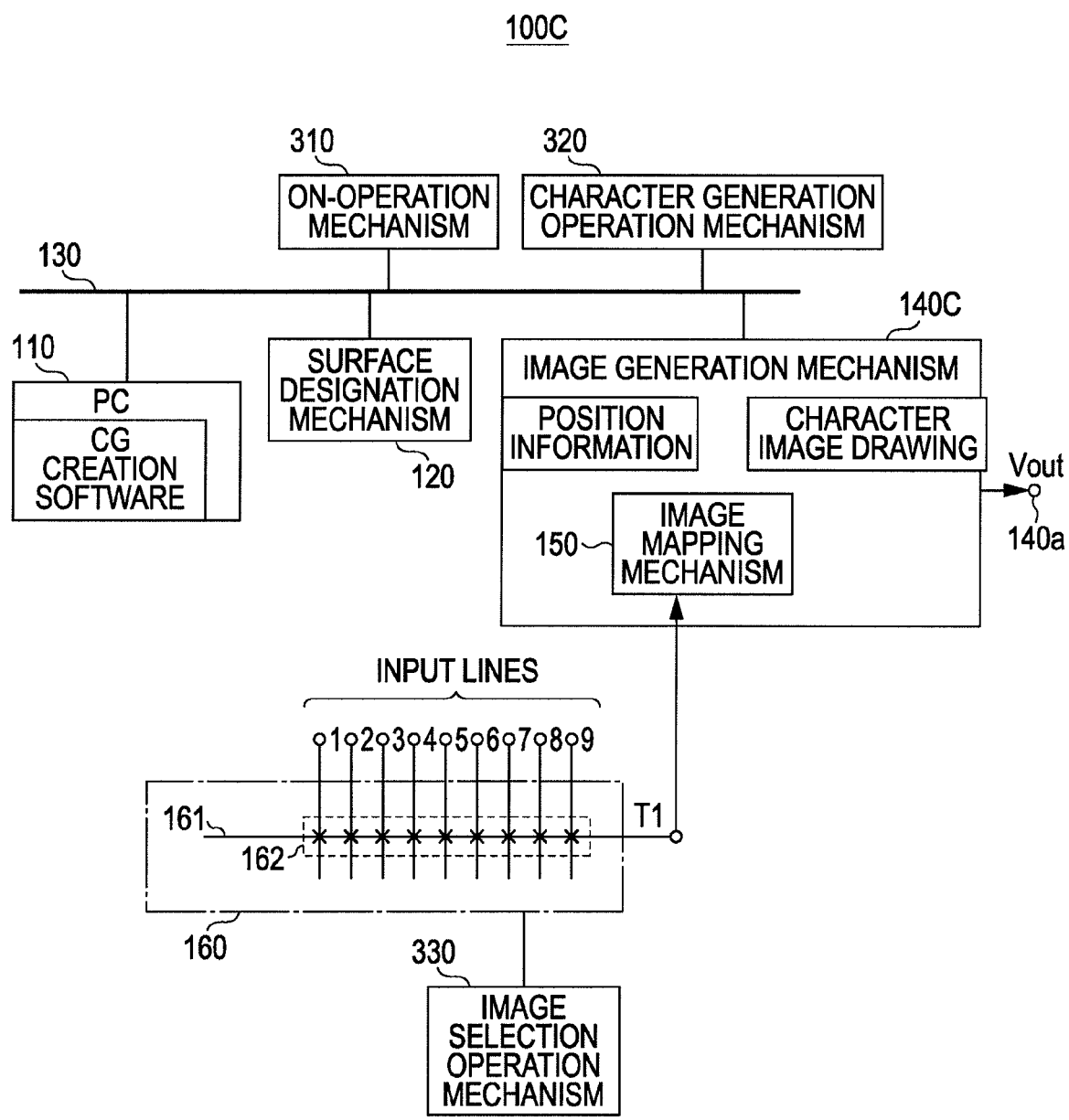
FIG. 23 is a block diagram illustrating a configuration example of an image processing device according to a fourth embodiment.

The fourth embodiment of the invention will be described. FIG. 23 shows a configuration example of an image processing device 100C according to the fourth embodiment of the invention. In FIG. 23, the same reference numerals are given to the elements corresponding to FIG. 1 and the description thereof will be omitted selectively.

The image processing device 100C includes a CG creation mechanism 110, a surface designation mechanism 120, a network 130, an image generation mechanism 140C, and an image mapping mechanism 150. Also, the image processing device 100C includes an auxiliary output unit 160, an image selection operation mechanism 330, an on operation mechanism 310, and a character generation operation mechanism 320. The CG creation mechanism 110, the surface designation mechanism 120, the image generation mechanism 140C, the On-operation mechanism 310, and the character generation operation mechanism 320 are respectively connected to the network 130.

The auxiliary output unit 160 enables the nine input lines where plural pieces of image data are input from an external device to be selectively connected to an auxiliary output selection bus 161. A cross point switch group 162 enables the nine input lines and the auxiliary output selection bus 161 to be connected to each other at the respective cross points where the both intersect each other. Image data extracted from the auxiliary output selection bus 161 is sent to the image mapping mechanism 150 as texture map image data T1. This auxiliary output unit 160 constitutes a texture map image data selection mechanism.

The image selection operation mechanism 330 receives an operation input of instruction for the auxiliary output unit 160. The image selection operation mechanism 330 includes, although not shown in the figure, a control panel which is provided with push button lines which operates On/Off of the switches of the cross point switch group 162 of the auxiliary output unit 160.

The surface designation mechanism 120 designates a texture map target to which an input image is texture mapped. The surface designation mechanism 120 sends the designation information to the image generation mechanism 140C via the network 130. The surface designation mechanism 120 displays the attribute values (names) given to an object or a part of the object in the CG description data, as an option, enables an operator to select it, and thereby enables the operator to select an object or a part of the object which is a texture map target. The surface designation mechanism 120 sends the attribute values given to the texture map target in the CG description data, to the image generation mechanism 140C as designation information for the texture map target.

The image generation mechanism 140C generates a CG image which is a 3D spatial image on the basis of the CG description data created by the CG creation mechanism 110. The image generation mechanism 140C stores various kinds of values in a key frame for executing animation in the memory. For example, in order to draw polygon sets which are present in the geometry information for an existing node, the material definition corresponding to the geometry information is referred to, and the drawing is made according to the designation of its colors or the like. In the case of animation, a current time is progressed for each frame, each value in before and after key frames is interpolated to be determined, and then the drawing is made.

The image generation mechanism 140C receives, from the surface designation mechanism 120, information for the designation of a CG object or a part of the object (faces or a division unit of a polygon mesh) which is a target where an input image is texture mapped. The image generation mechanism 140C controls the image mapping mechanism 150 to texture map the input image to surfaces of a predetermined polygon (polygon set) indicated by the designation information.

The image mapping mechanism 150 texture maps the input image to a surface of a texture map target designated by the surface designation mechanism 120, among the CGs drawn by the image generation mechanism 140C. The image mapping mechanism 150 is installed as a single body with the image generation mechanism 140C. The image mapping mechanism 150 is implemented by control due to software installed in a CPU and working due to hardware such as a GPU. The control software designates a polygon set undergoing the texture map and notifies the hardware of it.

The character generation operation mechanism 320 instructs generation contents for character images to the image generation mechanism 140C by an operation. The generation contents include character strings (arrangement of character codes), used fonts, sizes, and information for other attributes (bold faces, underline and so on). The on operation mechanism 310 instructs on/off of the superimposition (overlap) of the character images by an operation. The image generation mechanism 140C draws, on a CG image, the character images of contents designated by the character generation operation mechanism 320, using a character image drawing function, when the superimposition of character strings is On.

The image generation mechanism 140C calculates position information for a target (object or a part of the object) to which an image by the image data T1 is texture mapped in the image mapping mechanism 150 (refer to FIGS. 9 to 11). This is the same as the image generation mechanism 140 of the image processing device 100 shown in FIG. 1 described above. When the image generation mechanism 140C, as described above, draws the character images of contents designated by the character generation operation mechanism 320 on the CG image, it draws the character images on positions corresponding to texture map targets, based on the calculated position information.

The remaining parts of the image processing device 100C shown in FIG. 23 have the same configurations as the image processing device 100 shown in FIG. 1.

Operation Examples of the Image Processing Device

Operation examples of the image processing device 100C shown in FIG. 23 will be described.

The CG creation mechanism 110 generates CG description data for generating a predetermined CG image using the CG creation software. The CG description data generated by the CG creation mechanism 110 in this way is sent to the image generation mechanism 140C and surface designation mechanism 120 via the network 130.

In the surface designation mechanism (GUI) 120, an object or attribute values (names) given to the object in the CG description data are options, and a texture map target to which an input image is texture mapped is designated by an operation of an operator. This designation information (attribute values) is sent to the image generation mechanism 140C from the surface designation mechanism 120.

The image generation mechanism 140C generates a CG image which is a 3D spatial image, based on the CG description data created by the CG creation mechanism 110. In addition, as described above, the image generation mechanism 140C receives the designation information for the object or a part of the object which is a texture map target from the surface designation mechanism 120. Under the control of the image generation mechanism 140C, the image mapping mechanism 150 texture maps the image by the image data T1 obtained from the auxiliary output unit 160 to the surfaces of the texture map target.

When the superimposition for the character images is On by the On operation mechanism 310, the image generation mechanism 140C also draws the character images of contents instructed by the character generation operation mechanism 320. Here, the image generation mechanism 140C calculates position information for a target (object or a part of the object) to which an image by the image data T1 is texture mapped in the image mapping mechanism 150. When the image generation mechanism 140C, as described above, draws the character images, it draws the character images on positions corresponding to texture map targets, based on the position information.

Image data Vout of the CG image where the image by the image data T1 is texture mapped to the surfaces of the texture map target and, if necessary, the character images are also drawn, are output to an output terminal 140a which is derived from the image generation mechanism 140C.

The image processing device 100C shown in FIG. 23 texture maps the texture map image to the surfaces of the texture map target. Also, the character images are drawn (superimposed) on the CG image where the texture map image is texture mapped at a position corresponding to the texture map target, based on the position information for the texture map target. Therefore, in the image processing device 100C, the character images related to the texture map image can be inserted at the positions corresponding to the images so as to be easily viewed.

Also, in the image processing device 1000 shown in FIG. 23, the character images are drawn (superimposed) at a position corresponding to the texture map target by the image generation mechanism 140C, based on the position information for the texture map target. Therefore, character images or the like which can be generated by the function of the image generation mechanism 140C can be superimposed without other devices.

In the image processing device 100C shown in FIG. 23, one piece of image data selectively extracted from pieces of image data input to the nine input lines by the auxiliary output unit 160 is supplied for the image mapping mechanism 150 as the texture map image data T1. Thereby, an operator operates the image selection operation mechanism 330 to alter the image data extracted by the auxiliary output unit 160, thereby changing the texture map image into a desired image at any time.

5. Modified Example

A technique will be described in which images (moving images) which are reduced and modified by a digital special effect device are synthesized with (inserted into) a CG image. As a method of inserting a reduced image into a CG image, there is the above-described text map method. However, although this has an advantage of creating complicated images, the delay in the moving images is increased as much.

When a plurality of images are changed or synthesized for use, voices broadcast at the same time as the images are desired to be broadcast and transmitted with continuously constant delay. When the delay of the voices is varied on the way, a so-called "leaping" in the music or the like occurs, and this is harsh noise. For this reason, the delay of the voices is preferably constant.

Images having a large number of delay frames in the texture map or the like have the increasing number of delay compared with a case where a complicated processing is not performed, so are not synchronized with voices, and a motion of a mouth and voices are inconsistent with each other in the conversation. For this reason, for images captured by a camera or the like, processings including transmission are preferably completed so that the delay is as small as possible.

Therefore, it is less delayed and preferable that the images are synthesized with a CG image after they are reduced and modified using a digital special effect device in the related art, not using the texture map. Hereinafter, a control of combining modification such as reduction using a digital special effect device with a CG image generation mechanism will be described.

The digital special effect device is a device that writes and reads each pixel of input images in a memory and then outputs them in synchronization with synchronization signals, but makes image modifications such as expansion or reduction by changing orders of reading the pixels and writing the pixels (by address conversion). The digital special effect device is called a DME/DVP in short. Also, the digital special effect device has functions for other special effects (tone variation), in addition to the image modification such as expansion or reduction.

Figure 24C:
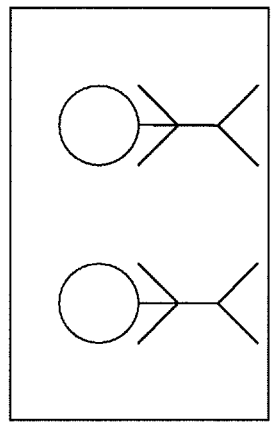
FIGS. 24A to 24E are diagrams illustrating insertion synthesis of a moving image.
Figure 24B:
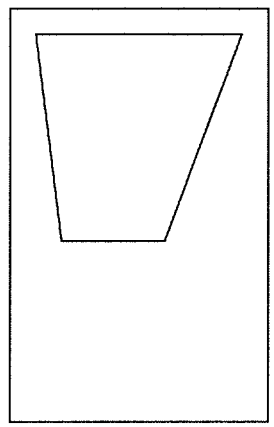
Figure 24E:
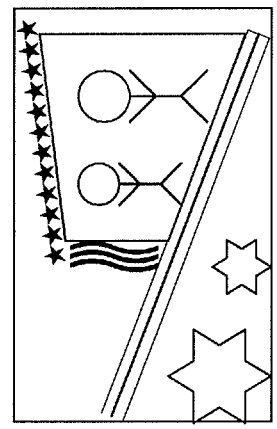
Figure 24A:
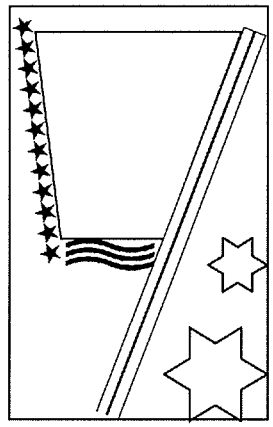
Figure 24D:
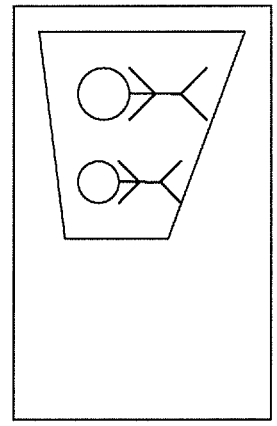
Figure 25A:
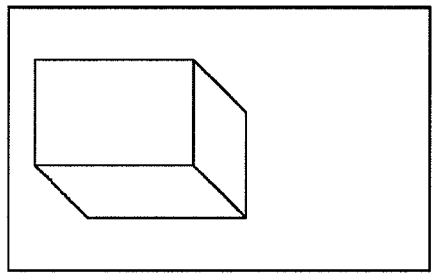
FIGS. 25A to 25F are diagrams illustrating variation of a CG image (motion) and an insertion synthesis.
Figure 25B:
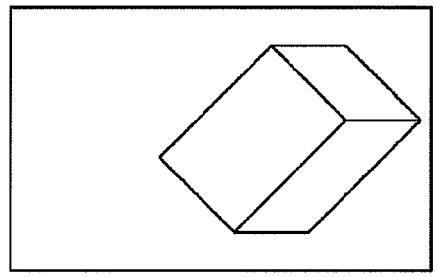
Figure 25C:
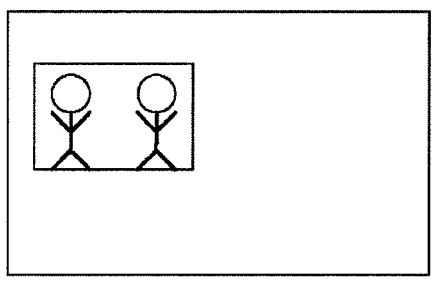
Figure 25D:
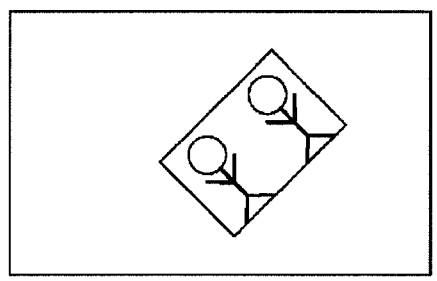
Figure 25E:
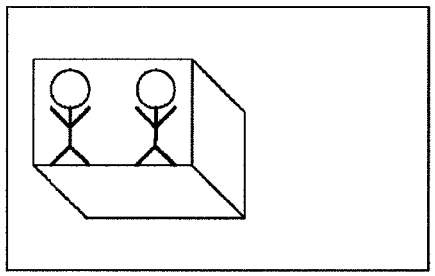
Figure 25F:
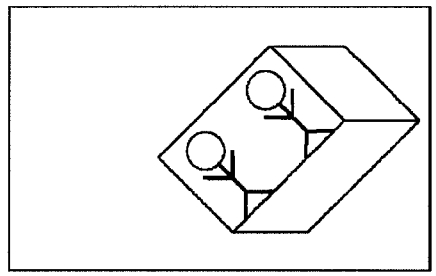

FIGS. 24A to 24E are diagrams illustrating drawings of such insertion synthesis. FIG. 24A shows CG images, and FIG. 24B shows a frame into which images (for example, images captured by a camera in a studio) are inserted. Using geometry information for the tetragon (coordinate values for four vertices) in the screen in FIG. 24B, images as shown in FIG. 24C are reduced and modified by the digital special effect device as shown in FIG. 24D, and the output images like the FIG. 24E can be obtained by synthesizing them with the CG images.

FIGS. 25A to 25F are diagrams illustrating the variation (motion) of CG images and the insertion synthesis. It is assumed that the CG images are varied from the state in FIG. 25A to the state in FIG. 25B by an animation operation of the CG images or a manual operation. In this case, if images inserted into them, corresponding to the motion, by the digital special effect device are varied like FIG. 25C and FIG. 25D, the synthesis images like FIG. 25E and FIG. 25F can be obtained, which reaches the same result as one of texture mapping the images to the face of the CG image.

Two methods are considered with respect to control communication in the system for reaching the same result as FIG. 25. One is that the CG image generation mechanism side is a master, and the images are varied based on operations following a time axis (time line) of animation, or manually operated parameters (for example, the above-described coordinate values for four vertices) are sent to the digital special effect device (refer to the following descriptions 1 and 2). The other is that the digital special effect device side (effect switcher) is a master, the inserted images are processed, the parameters are sent to the CG image generation mechanism, and there they are combined to move the CG object (refer to the following description 3)

"1. Working Conjunction with CG Animation"

In the configuration of the image processing device 100 shown in FIG. 1 above described, the key processor (image processing unit) 176 has a digital special effect function for the movement and reduction of the images. As information used in the control, the image generation mechanism (image mapping mechanism) 140 sends not a simple position but geometry information on the screen where the images are inserted (the coordinate values for four vertices in FIG. 24B described above). The key processor (image processing unit) 176 operates by receiving this geometry information.

As the geometry information (two-dimensional figure information) for the inserted portion, there may be used a center and a radius of a circle, the major axis (/semimajor axis) and the minor axis (/semiminor axis) of an ellipse, functions defining closed figures on the xy coordinates, or permutations of vertex information or the like.

When the CG images are varied in progress of the time line by the animation operation, the geometry information transmitted from the image generation mechanism (image mapping mechanism) 140 to the key processor 176 (image processing unit) is also accordingly varied. Each time when they are varied, the geometry information is, if necessary, transmitted from the image generation mechanism 140 to the key processor 176 via the position transmission mechanism 180 every field or every frame.

Timing for the transmission of the geometry information (parameters) and the digital special effect in the key processor 176, that is, processing timing in the image generation mechanism 140 and the key processor 176 is set as follows. In other words, the timing is set so that the key processor 176 exactly performs a related operation at timing (frame) where a corresponding frame of the CG image from the image generation mechanism 140 is input to the effect switcher side (the image synthesis switching unit 170).

"2. Manual Operation in the CG Side"

Figure 26:
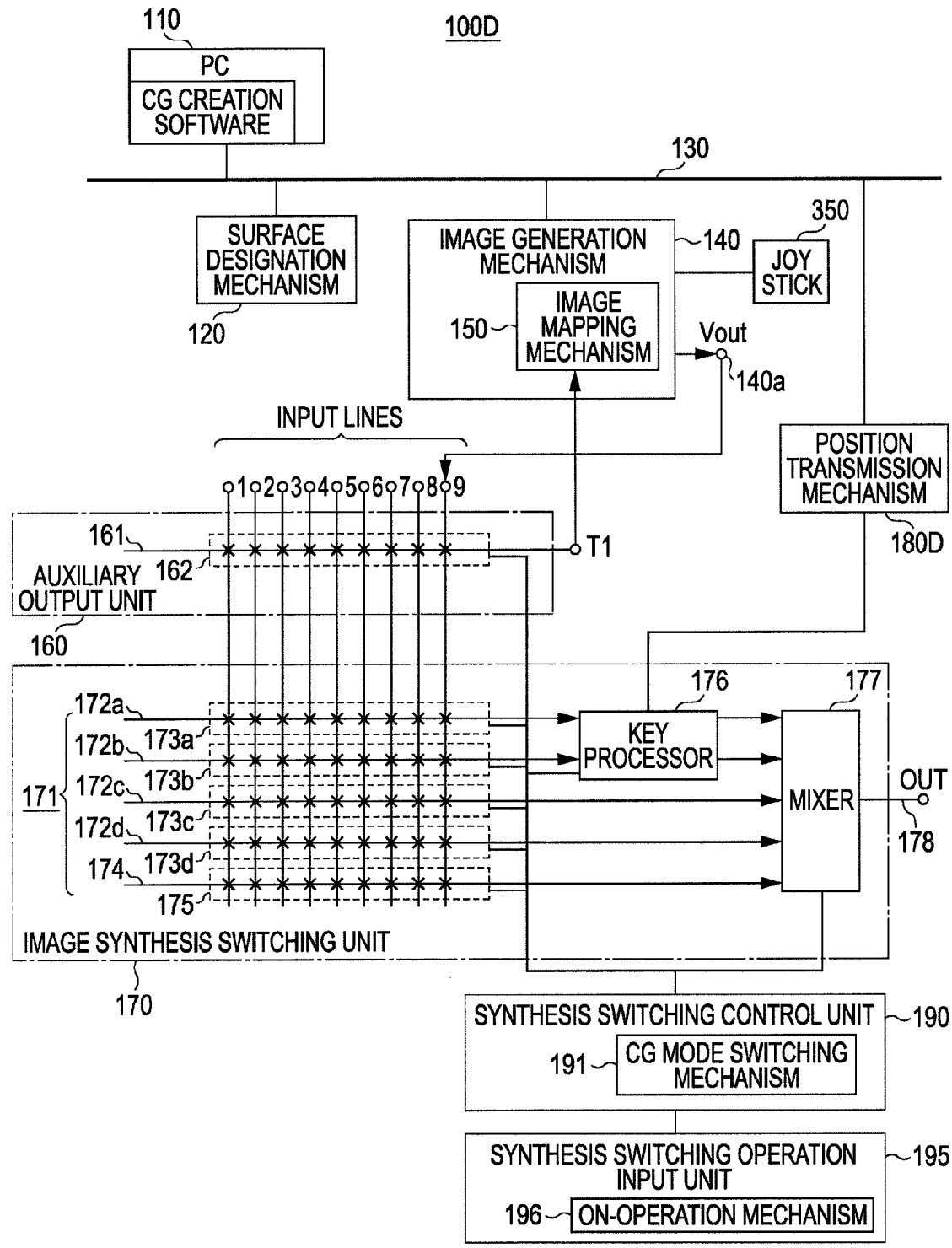
FIG. 26 is a block diagram illustrating another configuration example of the image processing device.

An image processing device 100D shown in FIG. 26 has a similar configuration as the image processing device 100 shown in FIG. 1 except that a manual operation mechanism for the CG image generation is provided in the image generation mechanism 140 and receives an operation input. FIG. 26 shows a joy stick 350 as the manual operation mechanism. FIG. 26 shows the elements corresponding to FIG. 1 by giving them the same reference numerals.

In the above example, although the geometry information (parameters) is varied depending on the progression of the animation, it is varied depending on the manual operation (joy stick operation, trackball operation, fader operation, mouse operation, or the like) in the image processing device 100D. For example, an operator freely moves the 3D virtual space shown in FIG. 25 in the x, y and z direction (where z direction is the depth direction of the screen). The image generation mechanism 140 transmits varied geometry information to the key processor (image processing unit) 176 via an insertion geometry information transmission mechanism 180D every field or every frame. The other operations are the same as the above example.

"3. Manual Operation in the Effect Switcher Side"

Figure 27:
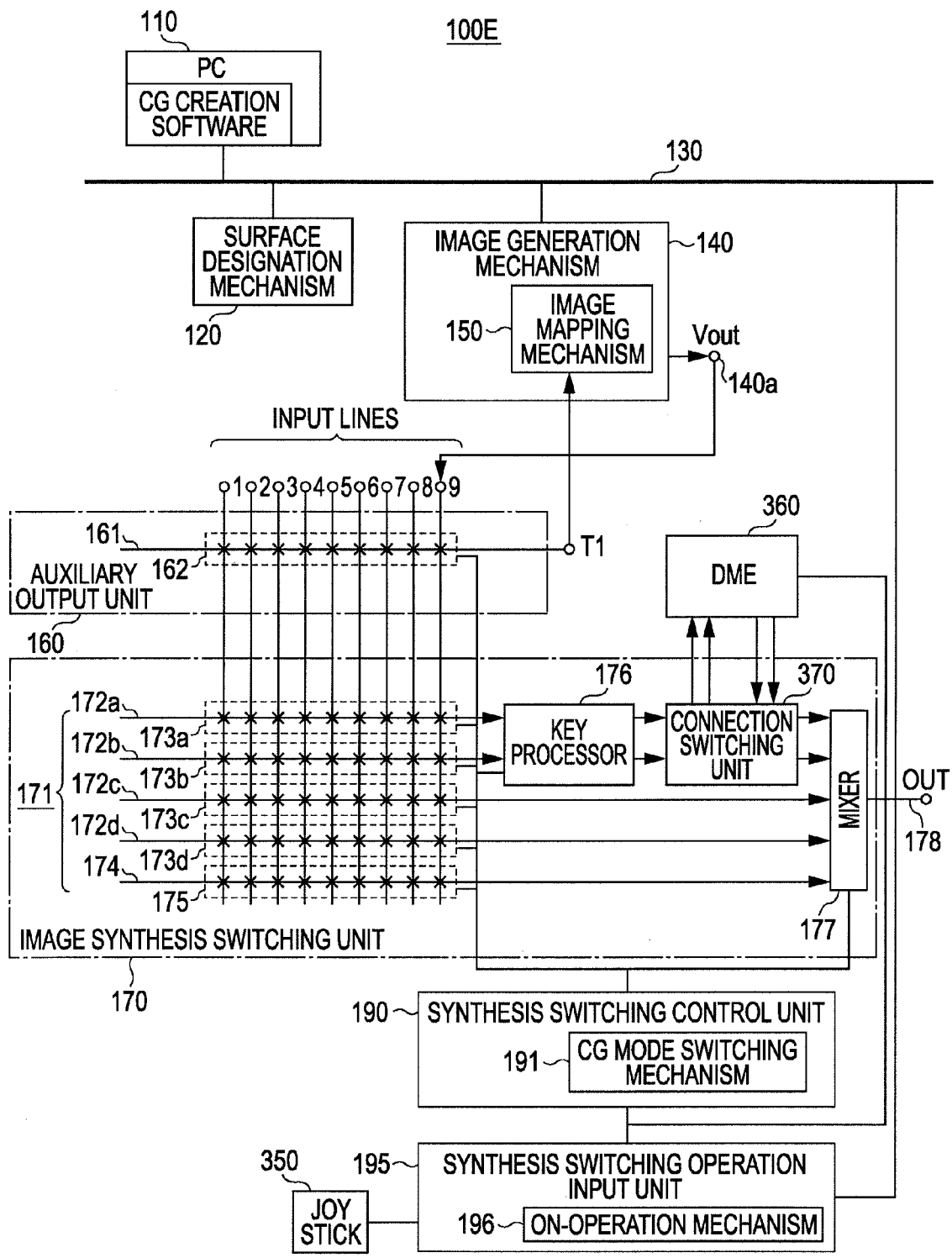
FIG. 27 is a block diagram illustrating still another configuration example of the image processing device.
Figure 28A:
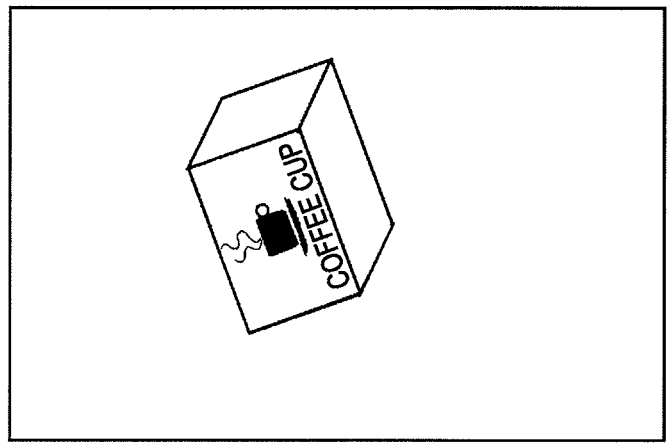
FIGS. 28A and 28B are diagrams illustrating image examples when a character string by superimposition is inserted into an image which is texture mapped to a surface of a CG object.
Figure 28B:
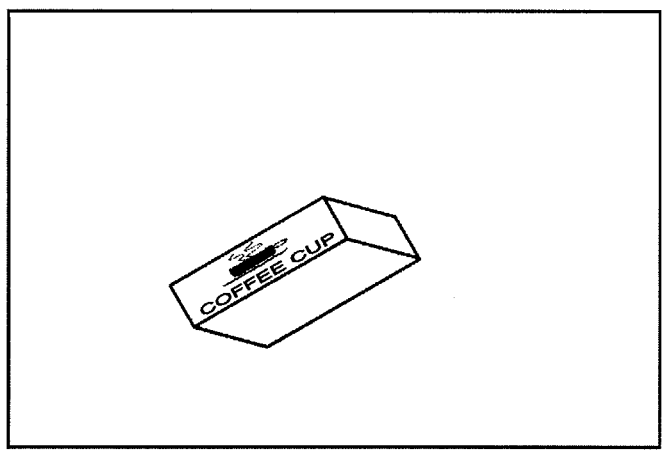

An image processing device 100E shown in FIG. 27 has a similar configuration as the image processing device 100 shown in FIG. 1 described above except that a manual operation mechanism for the digital special effect is provided in the effect switcher side (the image synthesis switching unit 170) and receives an operation input.

In the image processing device 100E, a digital special effect device 360 is provided not in the key processor (image processing unit) 176 but outside it. The synthesis switching operation input unit 195 is operated such that outputs from the key processor 176 are controlled to be via the digital special effect device 360 or not by a connection switching unit 370.

There is only communication of the information used for inserting the images in the image processing device 100D shown in FIG. 26 described above. However, in the image processing device 100E, in order to correspond the images operated by the digital special effect device 360 to a face of the CG object in the CG description data, the correspondence may be added.

A method of setting the corresponding CG object is, for example, the same as the method of setting the texture map target using the surface designation mechanism 120 of the image processing device 100 in FIG. 1. In other words, for example, surfaces (polygon sets) of the CG object where the images are inserted are designated by identifiers of a polygon instance. The CG object is a control target.

As another example, a material (surface attribute) is designated, a face of a polygon where the material is applied is designated as an insertion target, and a CG object having it is designated as the control target. Also, as another example, a face of a polygon designated so that a still image file is textured mapped at the time of creating the CG description data is designated as a target, and a CG object having it is designated as the control target. By these methods, CG objects which become the control targets are decided.

Next, the flows of the control will be described. The control from the joy stick 350 is sent to the digital special effect device 360 via the synthesis switching operation input unit (including microcomputer) 195 and the communication path, and the insertion image (sub-screen) can be operated. At the same time, the information (geometry information) for controlling the digital special effect device 360 is sent from the synthesis switching operation input unit 195 to the image generation mechanism 140, and, in response to the control, the image generation mechanism 140 moves the corresponding CG object in the screen (the virtual 3D space of the CG).

The control for the digital special effect device 360 is the same as that in the virtual 3D space of the CG object in principle. In other words, the insertion mage is put in the 3D space, and 3D transform such as movement or rotation therein is operated by an operator using the joy stick 350 or the trackball. Thus, in the image processing device 100E, along with the 3D transform being controlled in the digital special effect device 360 using the joy stick 350 or the like, the CG object is controlled in the virtual 3D space.

The special effect device 360 exactly performs a related operation at timing (frame) where a corresponding frame of the CG image from the image generation mechanism 140 is input to the effect switcher side (the image synthesis switching unit 170). For this reason, the processing timing for the control for the digital special effect device 360, the communication of the control information, and the CG object control in the image generation mechanism 140 is set. In this case, a delay is added to a side for the delay of the control. For example, if the time until a control is reflected on an output image after received is three frames in the image generation mechanism 140 and two frames in the digital special effect device 360, the control is firstly provided to the image generation mechanism 140 and then is provided to the digital special effect device 360 after delaying one frame.

Since both the images are synthesized in the mixer 177, as a result, it is possible to obtain an output image where the images extracted from the input lines are inserted into faces of desired CG objects so that the number of delay frames is comparatively small.

The following techniques are also applicable to the respective examples of the invention described above.

When On/Off of the superimposition in the manual operation, it is possible to perform not only a just instantaneous On/Off, but also a gradual fade-in/fade-out, or a gradual display or erase from the one side of the screen using a wipe signal.

In each of control timing, a delay of the control is appropriately added to a side having a less delay so that the control for synchronization at the time of synthesis works at the same frame in consideration of a delay until the control is reflected on the synthesized images.

Although the image is formed by the permutation of frames, it takes a time, for example, three frames, until the image input to the image mapping mechanism 150 or the like is reflected on the output from the image generation mechanism 140 or the like. Therefore, there is a delay until the images are synthesized after the cross point switch group 162 changing an input origin image such as T1 works, the control where the delay is added is performed. For example, when a control such as On of other superimposition is simultaneously desired to be added to the drawing by switching the image T1 or the like, the control for the cross point switch group 162 is firstly instructed, and thereafter, for example, the control for On of the other superimposition is performed by adding a delay of three frames.

Also, the embodiments of the invention are applicable to not only the operation by the animation but also the manual operation using the joy stick or the like.

The present application contains subject matter related to that disclosed in Japanese Priority Patent Application JP 2009-166176 filed in the Japan Patent Office on Jul. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
one or more processors operable to:
generate a computer graphics image based on computer graphics description data;
designate an object or a part of the object of the computer graphics image as a texture map target, and to texture map a first set of images to a surface of the texture map target;
superimpose a second set of images at a position corresponding to the texture map target of the computer graphics image where the texture map has been performed, based on position information for the texture map target of the computer graphics image; and
delay either a first signal from a user for the designation or a second signal from the user for moving the second set of images, wherein the delay synchronizes the designation with the superimposition.

2. The image processing device according to claim 1,
wherein the one or more processors are operable to set a correspondence relation between one or more of the first set of images and one or more of the second set of images,
wherein the second set of images are superimposed at the position corresponding to the texture map target, based on the correspondence relation.

3. The image processing device according to claim 1,
wherein the one or more processors are operable to designate the texture map target by selecting predetermined attribute values in the computer graphics description data,
wherein the texture map target is designated for one of the first set of images.

4. The image processing device according to claim 1, wherein the one or more processors are operable to generate the second set of images as computer graphics objects.

5. The image processing device according to claim 1,
wherein the one or more processors are operable to select one piece of image data from plural pieces of input image data,
wherein the selected one piece of image data is texture mapped on the surface of the texture map target.

6. The image processing device according to claim 1,
wherein the one or more processors are operable to select one piece of image data from plural pieces of input image data,
wherein the selected one piece of image data is superimposed based on the position information for the texture map target of the computer graphics image.

7. The image processing device according to claim 1,
wherein the one or more processors are operable to switch between a first mode where the texture mapped computer graphics image is used and a second mode where another image different from the computer graphics image is used,
wherein the first mode is configured to superimpose the second set of images at an image position corresponding to the texture map target of the computer graphics image where the texture map has been performed, based on the position information for the texture map target of the computer graphics image, and the second mode is configured to superimpose the second set of images at a predetermined position where there is the other image.

8. An image processing method comprising:
generating a computer graphics image based on computer graphics description data;
designating an object or a part of the object of the computer graphics image as a texture map target, and texture mapping a first set of images to a surface of the texture map target;
superimposing a second set of images at a position corresponding to the texture map target of the computer graphics image where the texture map has been performed, based on position information for the texture map target of the computer graphics image; and
delaying either a first signal from a user for the designation or a second signal from the user for moving the second set of images, wherein the delaying synchronizes the designation with the superimposition.

9. The image processing device of claim 1, wherein the computer graphics description data comprises definition of geometry information.

10. The image processing device of claim 1, wherein the computer graphics description data comprises definition of a camera.

11. The image processing device of claim 1, wherein the computer graphics description data corresponds to definition of a material of a surface corresponding to the object of the computer graphics image.

12. The image processing device of claim 1, wherein the computer graphics description data comprises definition of animation, wherein the definition of animation comprises time information in each key frame of animation.

13. The image processing device of claim 1, wherein the computer graphics description data comprises a position, a direction and a size corresponding to the object of the computer graphics image.

14. The image processing device of claim 1, wherein the one or more processors are operable to:
create one or more computer graphics objects corresponding to different surface attributes in the computer graphics description data; and
combine the created one or more computer graphics objects to generate the computer graphics image.

15. The image processing device of claim 1, wherein the generated computer graphics image is a three dimensional spatial image.

16. The image processing device of claim 1, wherein the one or more processors are operable to designate one or more material definitions in the computer graphics description data as the texture map target, based on a user input.

17. The image processing device of claim 1, wherein the one or more processors are operable to set a correspondence relation between one or more of the first set of images and one or more attribute values in the computer graphics description data.

18. The image processing device according to claim 17, wherein the one or more processors are operable to:
designate the texture map target by selecting predetermined attribute values in the computer graphics description data; and
texture map the designated texture map target with the first set of images based on the correspondence relation.

* * * * *